United States Patent (10) Patent No.: US 9,092,129 B2
Abdo et al. (45) Date of Patent: Jul. 28, 2015

(54) SYSTEM AND METHOD FOR CAPTURING HAND ANNOTATIONS

(75) Inventors: Samer Abdo, Denges (CH); Julien Piot, Rolle (CH); Greg Dizac, Lausanne (CH); Richard Milhe, Divonne-les-Bains (FR); Guillaume Bourelly, Lausanne (CH); Matthieu Meisser, Lutry (CH); Fabiano Pedrotta, Romanel-sur-Morges (CH); Thomas Gaëtan Brisebras, San Francisco, CA (US); Candice Patricia Tillitt, San Francisco, CA (US); Alice Estelle Loeb, Emeryville, CA (US)

(73) Assignee: Logitech Europe S.A., Lausanne (CH)

( * ) Notice: Subject to any disclaimer, the term of this patent is extended or adjusted under 35 U.S.C. 154(b) by 140 days.

(21) Appl. No.: 13/047,962

(22) Filed: Mar. 15, 2011

(65) Prior Publication Data

US 2011/0248941 A1 Oct. 13, 2011

Related U.S. Application Data

(60) Provisional application No. 61/314,639, filed on Mar. 17, 2010, provisional application No. 61/366,169, filed on Jul. 21, 2010.

(51) Int. Cl.
*G06F 3/045* (2006.01)
*G06F 3/044* (2006.01)
*G06F 3/0488* (2013.01)

(52) U.S. Cl.
CPC .............. *G06F 3/0488* (2013.01); *G06F 3/044* (2013.01); *G06F 3/045* (2013.01); *G06F 2203/04101* (2013.01); *G06F 2203/04104* (2013.01)

(58) Field of Classification Search
CPC ....... G06F 3/0412; G06F 3/044; G06F 3/045; G06F 3/0488; G06F 3/04101; G06F 3/04104

USPC ........... 345/173–184, 104; 178/18.01–18.06; 349/12
See application file for complete search history.

(56) References Cited

U.S. PATENT DOCUMENTS 5,138,322 A 8/1992 Nuttall
5,509,650 A 4/1996 MacDonald et al.
(Continued)

FOREIGN PATENT DOCUMENTS

EP 2 068 235 6/2009
WO WO 2005/077466 8/2005

OTHER PUBLICATIONS

Butler et al., SideSight: Multi-"touch" interaction around small devices, Microsoft Research, Proceedings of the ACM Symposium on User Interface Software and Technology (UIST '08), Oct. 2008.

*Primary Examiner* — Lun-Yi Lao
*Assistant Examiner* — Ibrahim Khan
(74) *Attorney, Agent, or Firm* — Kilpatrick Townsend & Stockton LLP

(57) ABSTRACT

A capture device for remote, virtual on screen data input by hand annotation comprises at least three functional layers including a bottom rigid layer, a middle pressure sensor layer and a top flexible layer. The bottom rigid layer has a surface that provides a mechanical support for writing. The middle pressure sensor layer is adapted to measuring a pressure array or map on the capture active area and to send data representing the measured pressure to a personal computer. The top flexible touch-sensitive passive LCD display layer includes an LCD surface by which whatever is written down on the LCD is impressed graphically due to its liquid crystal physical properties wherein applied pressure changes the crystal particles orientation and light properties, such that when a stylus presses against a writing surface thereof, it leaves a visible trace allowing the user to produce a drawing though no real ink has flown.

41 Claims, 17 Drawing Sheets

(56) References Cited

U.S. PATENT DOCUMENTS

| | | |
|---|---|---|
| 6,144,366 A | 11/2000 | Numazaki et al. |
| 6,292,130 B1 | 9/2001 | Cavallaro et al. |
| 6,304,665 B1 | 10/2001 | Cavallaro et al. |
| 6,760,061 B1 | 7/2004 | Glier et al. |
| 7,653,883 B2 * | 1/2010 | Hotelling et al. ............ 715/863 |
| 7,900,156 B2 | 3/2011 | Andre et al. |
| 8,228,301 B2 * | 7/2012 | Schneider .................... 345/173 |
| 2002/0003726 A1 * | 1/2002 | Hattori et al. ................ 365/200 |
| 2002/0196238 A1 | 12/2002 | Tsukada et al. |
| 2006/0026521 A1 | 2/2006 | Hotelling et al. |
| 2006/0197753 A1 * | 9/2006 | Hotelling .................... 345/173 |
| 2007/0018970 A1 | 1/2007 | Tabasso et al. |
| 2007/0085837 A1 * | 4/2007 | Ricks et al. .................. 345/173 |
| 2007/0171210 A1 | 7/2007 | Chaudhri et al. |
| 2008/0316417 A1 * | 12/2008 | Kurosaki et al. ............ 349/154 |
| 2009/0146968 A1 | 6/2009 | Narita et al. |
| 2009/0219250 A1 * | 9/2009 | Ure ............................... 345/169 |
| 2010/0020043 A1 | 1/2010 | Park et al. |
| 2010/0103115 A1 * | 4/2010 | Hainzl ......................... 345/173 |
| 2010/0182263 A1 * | 7/2010 | Aunio et al. ................. 345/173 |
| 2010/0315413 A1 | 12/2010 | Izadi et al. |
| 2011/0141012 A1 | 6/2011 | Noh et al. |
| 2011/0148770 A1 * | 6/2011 | Adamson et al. ............ 345/173 |
| 2011/0304542 A1 | 12/2011 | Calderon |

* cited by examiner

| DATA INPUT TYPE | DATA INPUT | SPECIAL FUNCTION OR OUTPUT |
|---|---|---|
| keying | One finger | "SWYPE" |
| keying | Two fingers | e.g. Capital |
| keying | Three fingers | e.g. Ctrl + Alt + Del and special characters |
| pointing | One finger | Use keyboard 40, disable imput pad 44 unless greater proximity to pad 44 is detected. Or use keyboard embodiment of FIG.1 |
| pointing | two or more fingers | Switch to imput pad 44, unless proximity to keyboard 40 is detected. Or use keyboard embodiment of FIG. 2. |
| gesturing | multiple fingers | Scrolling with two fingers. Pinch to zoom. |
| inking | stylus | Switch mode to inking mode, optionally disable unnecessary functionality |

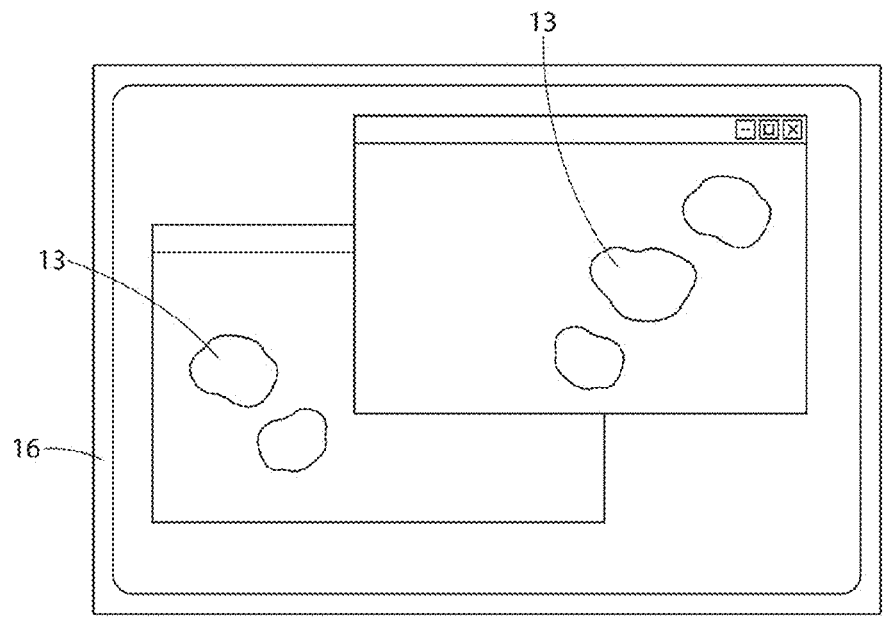
FIG. 18
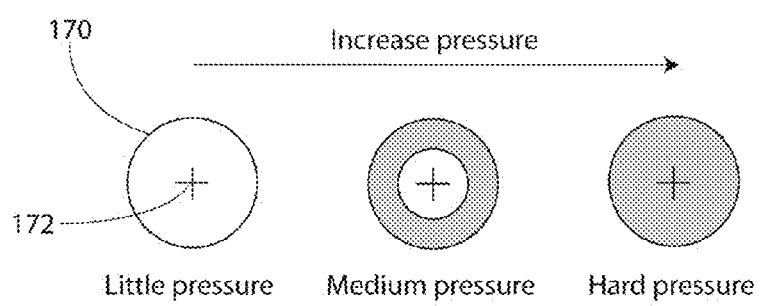
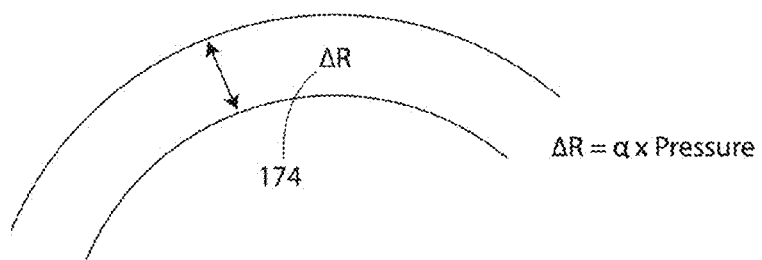
FIG. 19

SYSTEM AND METHOD FOR CAPTURING HAND ANNOTATIONS

CROSS REFERENCE TO RELATED APPLICATIONS

This application claims the benefit of U.S. Provisional Application No. 61/314,639 filed 17 Mar. 2010 and U.S. Provisional Application 61/366,169, filed 21 Jul. 2010, respectively, the contents of both of which are incorporated herein by reference thereto.

COPYRIGHT & LEGAL NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever which it owns. No license is granted in the works of third parties except as provided under fair use doctrines. Further, no references to third party patents or articles made herein is to be construed as an admission that the present invention is not entitled to antedate such material by virtue of prior invention.

BACKGROUND OF THE INVENTION

This invention relates to input devices and methods, in particular, systems and methods for inputting data in and transmitting commands for a personal computer.

It is known to use input devices such as a mouse and a keyboard to input data or commands into a personal computer (PC) or multimedia system (such as a television, Set-top box, Game console, or other computer processing device), connected via data buses, data interfaces, wireless RF, infrared, "BLUETOOTH"™, via a data hub to a PC.

Further, single touch and multitouch keyboards or input devices are known, and allow, as the case may be, single or multiple inputs from a user. In other words, single touch interfaces read one input at a time, while multitouch can read/sense two or more inputs at a time.

Recently, multi-touch technologies are emerging for application in mobile phone technology. Companies such as Stantum S.A. in France, STMicroelectronics in France, and Synaptics Inc. in the US are developing multi-touch technologies in response to mobile phone customer demands. Such multi-touch input devices use resistive and capacitive sensing to sense the presence of an object within its detection field.

Input devices in the form of graphic tablets are known and available from companies such as Wacom Inc. of Vancouver, Wash. The KINDLE EBOOK is a further tablet that is offered by Amazon of New-York City, New-York.

Among the capture devices for a personal computer (keyboard, mouse, touchpad), none of them support intuitive capture of hand drawings and hand written notes at a very low-cost.

High-end graphics tablets with embedded active displays are available, but they are expensive, as they require a dedicated processor to manage and update the display based on pen activity.

What is needed however for a simpler way for entry of hand annotations at a low cost thanks to a passive LCD display and a resistive touch sensor. What is needed is an input device that optionally allows real paper to be used on top of the display to better match the natural pen on paper experience.

Still further, what is needed is an apparatus, system and method offering to the user a way to remotely touch a screen using a remote input device which is portable and separate from the display device. What is needed is an apparatus, system and method which provides the user with the ability to input text as he or she would have performed directly on a display having an integrated multitouch surface thereon without physically touching the display.

In addition, what is needed is an apparatus, system and method which allows the user to observe a virtual keyboard and a virtual representation of his or her fingers positioned at the correct location relative to the virtual keyboard on the display device.

SUMMARY OF THE INVENTION

A system and method of remote, virtual on screen data input. This system comprises (a) the multitouch annotation control device (MTAC) using a passive stylus, a transmitter and interface device adapted to connect to, communicate with and transmit data and commands to a remote processor in a PC or multimedia system (such as a television, Set-top box, Game console); and (b) instructions executable on the remote processor for receiving data inputs from a MTAC; the instructions, when data is transmitted from the annotation device, displaying a virtual representation of the MTAC on a computer screen along with a virtual representation of at least one finger of the user, positioned on the display relative to the virtual MTAC in an orientation which recreates, in 2D plan view, the real world relative position of the user's finger with the real world MTAC, receiving data inputs from the MTAC and processing such in an manner appropriate to the class of data transmitted, whether representative of a annotation, or command input.

Such virtual representation of the user's finger may be a simple abstraction thereof, such as a mouse cursor.

The MTAC provides two modes of operation, inking capture and fingers capture.

In inking capture mode, the device allows the user to draw or enter hand written notes with help of a passive stylus depositing no real ink but rather displaying stylus strokes in real time as they are created. No ink is actually deposited, but the stylus ink effect is rendered due the ink display being located on the upper layer of the capture surface. The ink display is a passive LCD display. Due to the incorporation of a pressure sensor in the device, the user can recover the drawing or notes in a personal computer for further processing, such as integrating it in a document, post-it, etc.

In ink capture mode, the fingers location and pressure are monitored in real time. The finger locations are rendered on the personal computer display. The operating system then reacts in real time to finger activities, depending on their location and pressure.

By personal computer (PC), it is meant (here and in the rest of the document) a device allowing digital information manipulation in the broad sense. For example, it can be a PC, a Mac, a notebook, a netbook, a notepad, a tablet, an eBook, or a smart phone.

The MTAC can be implemented in multiple devices, such as a keyboard, docking station, lapdesk, or stand-alone wireless device. The annotation MTAC allows the user to draw with a passive pen or stylus (no ink) on its sensitive surface and then recover the drawing in a personal computer. Of course, where handwriting is captured, handwriting recognition software running on the PC can convert these annotations into text for further processing, in a known manner.

In one embodiment, the annotation MTAC is composed of multiples layers. The bottom layer is a rigid surface that provides a mechanical support for writing, as the 2 upper layers are flexible. The middle layer is a resistive touch sensor that measures position and force of the various touch points that are pushing onto the top layer (normally only the stylus in inking mode, one or more fingers in finger capture mode). The touchpoints information (location and pressure, type, proximity, etc.) can be either transmitted to the PC immediately as they occur, or stored internally and then transmitted as a whole when annotating is finished. The top layer is a flexible touch-sensitive writing tablet. In one embodiment, the top layer utilizes a reflective bistable cholesteric liquid crystal laminated between two conductive-polymer coated polyethyleneterephthalate substrates. Thanks to cholesteric technology, the LCD layer is touch-sensitive in that whatever is written down on the LCD is stored graphically.

In an alternative embodiment, the user desires to draw with a real pen on real paper; the same device can be used in this case: simply apply a sheet of paper onto the device sensitive surface thanks to the embedded clip mechanism. Draw on the paper. When finished remove the paper, and push the active button, as in the case where no paper is present. Adding paper brings a more natural pen on paper interaction that some users will prefer.

An object of the invention is simplifying the entry of hand annotations, at a low cost, thanks to a passive LCD ink display and a resistive pressure sensor. In one embodiment, the device is used jointly with a tablet (iPad) or a PC (Windows 7, Mac). It allows entries of pen annotations into electronics format documents (pen operation). Additionally, the same device is used as a multi-touch control device (finger controls) in a manner similar to Windows 7 touchscreen control but without the need to actually touch the screen. The combination of hand annotations and multi-touch control advantageously replaces the mouse-and-keyboard interaction tools.

Another object of the invention is to allow a user to input data into a virtual keyboard remotely from a displayed virtual image of the keyboard. In this manner, a user is provided with the user experience of using a touch screen display device remotely from such device without requiring the physical hardware of a touch screen display. In addition, a user can input data without having to glance down at a remote input device but rather keep the user's visual focus on the display device.

Another object of the invention is to permit a user more comfort and flexibility in interacting with a PC or multimedia device, such as a multimedia player or TV.

Another object of the invention is to ensure the user a good drawing experience as the user sees the drawing at the location where the stylus is acting (unlike graphic tablets). Because there is no need to actively manage a display as in tablet or eBook cases (pressure directly updates the screen), the device can be built at a low cost.

BRIEF DESCRIPTION OF THE DRAWINGS

FIG. 13 is a table showing representative classifications of inputs.

FIG. 18 is a schematic diagram of a graphical user interface in accordance with one embodiment of the invention.

FIG. 19 is a schematic diagram of a pressure map in accordance with one embodiment of the invention.

Those skilled in the art will appreciate that elements in the figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF SOME PREFERRED EMBODIMENTS

The following description is not intended to limit the scope of the invention in any way as they are exemplary in nature and serve to describe the best mode of the invention known to the inventors as of the filing date hereof. Consequently, changes may be made in the arrangement and/or function of any of the elements described in the disclosed exemplary embodiments without departing from the spirit and scope of the invention.

Figure 1:
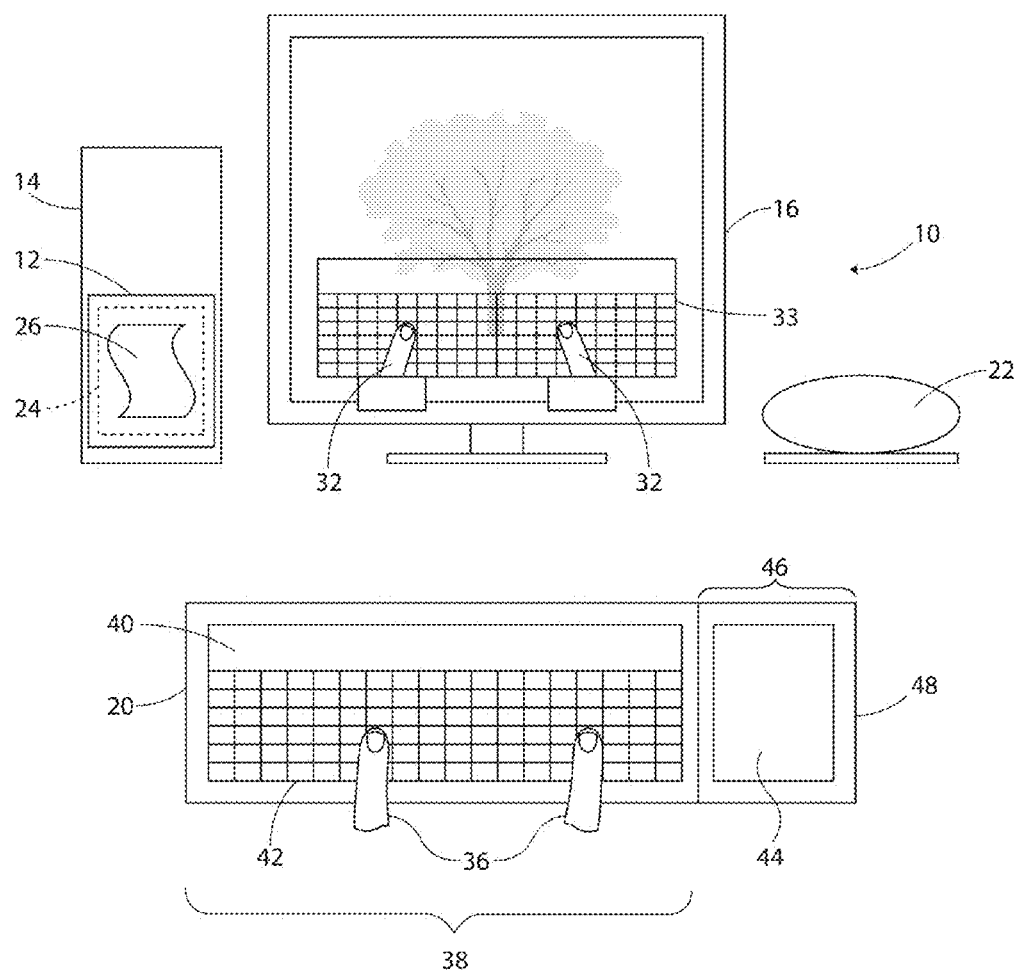
FIG. 1 is a perspective view of a section of the system in accordance with one embodiment of the invention.

Referring to FIG. 1, a system 10 according to one embodiment of the invention includes an interconnected computer processor 12 (housed in a PC or multimedia device 14, or housed in the MTAC itself wherein the MTAC interacts with a display, such as a TV), a display device 16, an input device 20, and a wireless hub 22. The computer processor 12 and operating system 24 executes instructions 26 for carrying out the method 30 of the invention (described in association with FIGS. 14 and 17). The instructions 26 are executed on the OS 24 to receive and process data received from such MTAC 20 in order to display representations 32 of a user's finger 36 and at least a representation 33 of the input field 40 of the MTAC 20 on the display device 16 so as to mimic the relative location and input functions performed by a user on the MTAC 20. In this manner, one embodiment of the invention provides remote, virtual on-screen data input.

The computer processor 12 and operating system (OS) 24 execute instructions 26 for carrying out the method 30 of the invention.

Optionally, as shown in the figure, the multi-touch input surface 44 of the MTAC 20 is integrated onto a housing 46.

The MTAC 20 incorporates functionality of emerging touch data input devices such as those available from Stantum in France, STMicroelectronics in Switzerland, Cypress Semiconductors in the U.S., Avago Technologies in the U.S. and Synaptics in the US. The MTAC includes a touch surface 40. Optionally, the input device 46 may be readily removable while being in wireless contact with the wireless hub 22 and/or communication device (not shown) integrated in the MTAC 20.

Integration of the Device in a System

Referring now to FIGS. 2 to 5, the MTAC 20, 20', 20" is used in multiple systems such as in a keyboard 1 (the device is located, for example, to the right of or below a computer keyboard), in a lapdesk 2, operated jointly with a notebook 3, or notepad, in a stand-alone wireless battery powered device, operated jointly with a PC, a notebook, or notepad (a wireless link allows communication between the MTAC 20 and the PC 14). In embedded form, the device is embedded in a dual screen tablet 4, one screen being the active display 5, the second screen 6 being a display devoted to virtual ink display 6, further comprising the pressure sensor 9 underneath. As an alternative, the virtual ink display 6 is part of the active display 5, allowing for a single display embedded device, again with the pressure sensor 9 underneath.

Figure 6:
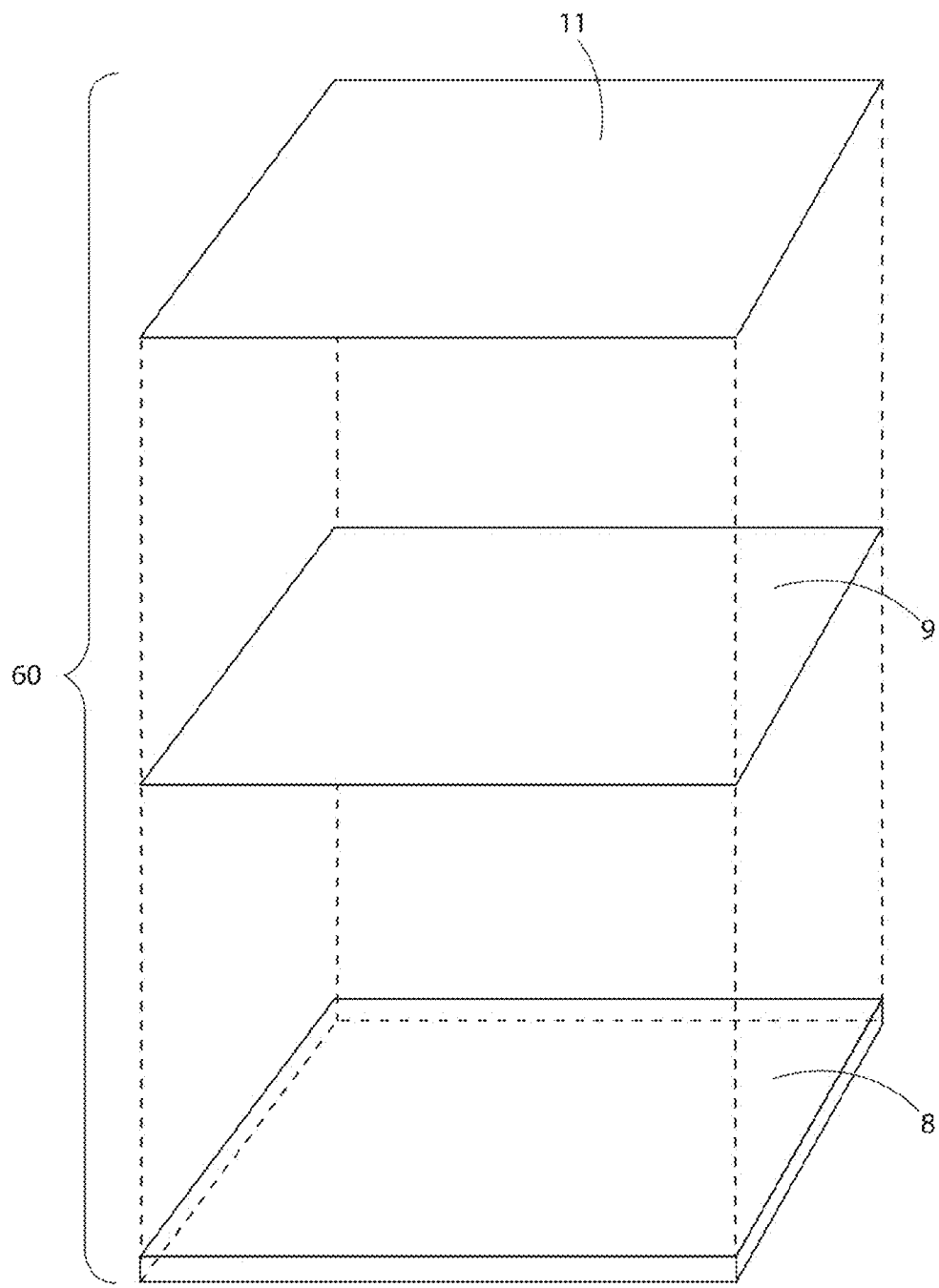
FIG. 6 is an exploded view of the capture device of the invention.

Referring now to FIG. 6, in one embodiment, the MTAC 20 includes a multilayer assembly 60 including a bottom layer 8, an intermediate pressure sensor layer 9 and a top layer 11. In one embodiment, the bottom layer 8 is a rigid surface that provides a mechanical support for writing, as the two upper layers are flexible. In some embodiments, the bottom layer 8 can exhibit some degree of flexibility, for example to appear more like a paper notepad.

In one embodiment, the pressure sensor layer 9 is a pressure sensor layer detecting touch and pressure on the capture active area. The layer 9 is connected to multiple voltage sources and multiple ammeters, defining multiple electrical conductive paths, whose conductivity is modulated by the applied pressure on that path, described in more detail below with respect to FIG. 22. At least one ammeter measures current emitted from more than one of said voltage sources. PERATECH (www.peratech.com) is a supplier of one embodiment of resistive pressure sensors suitable for use in the invention. Alternatively, keyboard membrane technology involving silver ink and carbon ink sandwiched between 2 PET membranes can be used. Alternatively, capacitive pressure sensors can be used. A capacitive pressure sensor is constructed with a compressible material located between two electrodes. When compressed, the capacitance between the electrodes is altered. Note that other embodiments of a multilayer assembly 60', 60" are disclosed with respect to FIGS. 11 and 16, in which the middle layer is a modified middle layer 9' or 9" detecting hovering and proximity.

The top layer 11 is a flexible touch-sensitive passive LCD display, utilizing for example a reflective bistable cholesteric liquid crystal laminated between two conductive-polymer coated polyethyleneterephthalate substrates, such as found in Reflex technology supplied by Kentdisplays (www.kentdisplays.com). The passive LCD technology is touch-sensitive in that whatever is written down on the LCD is impressed graphically thanks to its liquid crystal physics properties (applied pressure changes the crystal particles orientation and light properties). When the stylus 15 is writing on the device, it leaves a visible trace allowing the user to produce a drawing though no real ink has flown. More advanced passive LCD displays include multiple colors.

Figure 21:
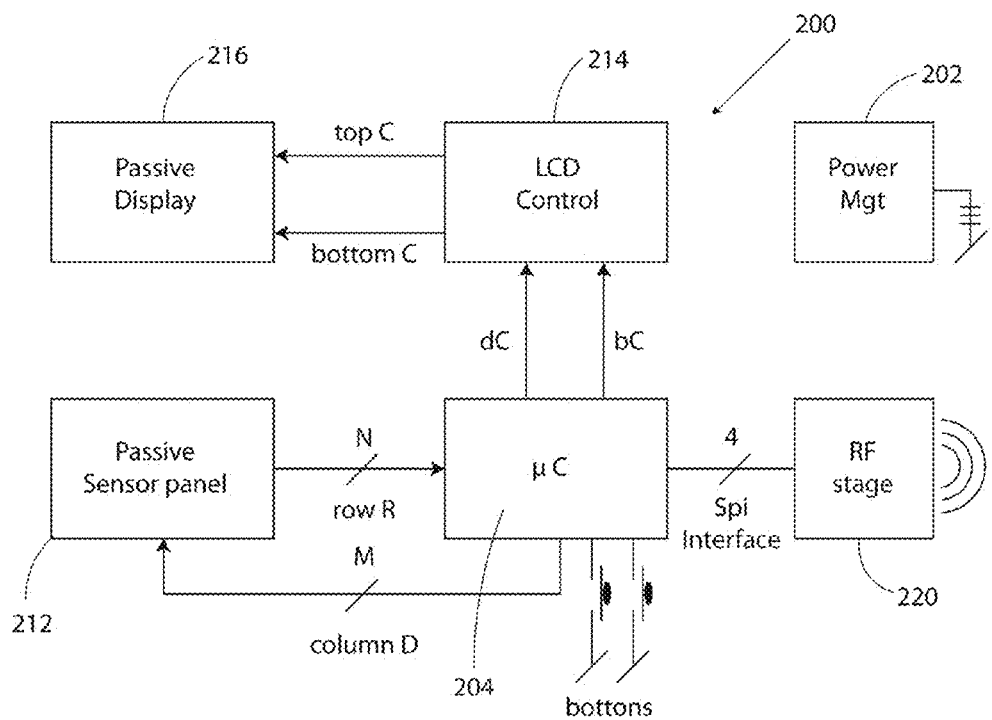
FIG. 21 is a block diagram of the control board in accordance with one embodiment of the invention.

The MTAC 20 further comprises a control board 200 (depicted in FIG. 21). This board is described below. Among other functionality, the control board 200 classifies the measured pressure map into various pressure points with position and force (either from finger, stylus, or palm).

The MTAC 20 is connected to the personal computer built-in processor, either through USB, Bluetooth, other 2.4 GHz RF link, SP1 or I2C interface, so that the device and the PC 14 can communicate bi-directionally. Transmitted packets information comprises pressure activity data, time stamps, touch-point identifier, proximity, and type.

The target 36, mentioned above, although typically a user's finger or fingers, can also be various other things such as, but not limited to, a user's hand or hands, arm or arms, identifiers on gloves, rings, etc., a stylus or styluses, pencil or pencils, pen or pens, and a pointer or pointers.

Figure 7:
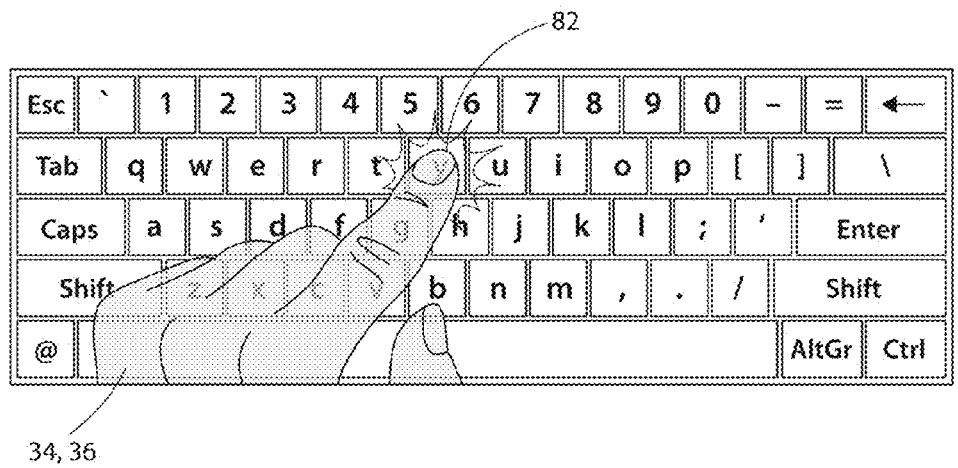
FIG. 7 is a top view of the display device in accordance with one embodiment of the system of the invention showing a virtual keyboard with the target overlaid in transparent mode.

Referring to FIG. 7, preferably, the representation of the target 36 and the input surface 40 for display in a window of the display 16 are transparent (i.e., displayed in transparent mode), permitting viewing of screen content visually underneath the representation of the target or input field.

Figure 8:
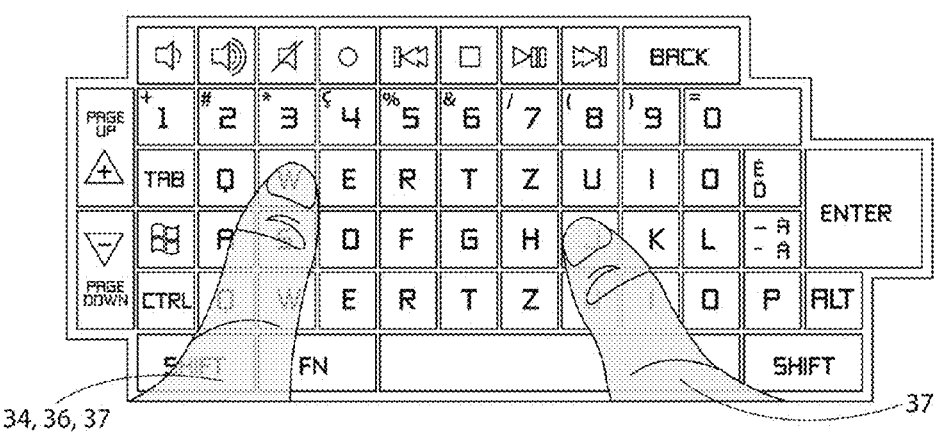
FIG. 8 is a top view of the display device in accordance with one embodiment of the system of the invention showing a second virtual keyboard with targets, in this case, thumbs, overlaid in transparent mode.

In one input example, the user 34 types information into the input device 20 in the normal way. In another input example, as shown in FIG. 8, the user enters text naturally with his or her two thumbs 37 while holding the MTAC 20, 20', 20" in hand. In such an example, both of the user's thumbs 37 are displayed and correctly placed on the virtual representation 32 on the display 16 as the thumbs are hovering over and/or touching the MTAC surface 40, 44.

In one embodiment, the MTAC 20 includes a touch surface 40 providing a keyboard input field 42, as well as a touch surface 44 for use on the housing 46 of an auxiliary pointing or number input device 48, at the selection of the user 34. Separate touch surfaces 40 and 44 allow the use of a lesser expensive single touch surface for touch surface 40, through which text inputs may be entered, whereas the more expensive multi-touch surface 44 is minimized, yet can control the modes of operation of the single touch surface 40, by allowing multi-touch inputs to the multi-touch surface 44 to allow toggling between key overlays, for example. Optionally, the input device 48 may be readily removable while being in wireless contact with the hub 22 and/or communication device (not shown) integrated in the MTAC 20.

It should be noted that a variety of proximity sensors are suitable for use with the invention. Sensors which work by emitting an electromagnetic or electrostatic field, or a beam of electromagnetic radiation (infrared, for instance), and looks for changes in the field or return signal may be used. The types of suitable sensors available include but are not limited to inductive, capacitive, capacitive displacement, eddy-current, magnetic, electromagnetic, photocell, laser range-finding, sonar, radar, Doppler effect, passive thermal infrared, passive optical, ionizing radiation reflective sensors, reed switch, hall effect, resistive variation, conductive variation, echo (e.g. sound be it ultrasonic or radar), optical pattern recognition technologies and micro air flux change (detections of air current variations between sensors as opposed to macro flux changes). For example, a capacitive or photoelectric sensor might be suitable for a plastic target while an inductive proximity sensor requires a metal target and a Hall Effect sensor a magnetic target.

Optical sensing using, for example, infrared proximity sensing, involves using an optical sensing circuit to pulse light, e.g., infrared light, emitted from an emitter which, should an object such as a user's finger be present in front of or above the emitter (e.g., a laser diode or LED), reflects off of the user's finger and back toward an infrared detector (e.g., a photodiode, a type of photodetector capable of converting light into either current or voltage, depending upon the mode of operation), generally adjacent or concentric with the emitter and configured to detect changes in light intensity. If reflected infrared light is detected, it is assumed that an object is present, proximate the infrared emitter. If not, then it is assumed no object is present. When a threshold of light is detected that corresponds to touch, at distance of 0 mm, then touch is indicated and whatever action that is to be executed upon touch is initiated. In such a case, the touch parameter is a parameter of sufficient proximity, which is typically contact, at which proximity a touch signal indicating touch is sent to the processor 12, thereby allowing traditional keypad use with the benefits of touch pad use. As an example of a suitable infrared proximity sensor, Avago Technology's proximity sensors are reflective, non-contact sensors in a small form factor SMT package that offer detection ranges from near zero to 60 mm with analogue-output. Suitable for use in mobile applications and industrial control systems, their model APDS-9101 is a low cost, integrated reflective sensor incorporating infrared LED and a phototransistor designed to provide object detection and non-contact proximity sensing in the detection range of near 0 mm to 12 mm. The proximity sensors described in U.S. patent application Ser. No. 11/418,832, entitled OPTICAL SLIDER FOR INPUT DEVICES, the content of which is incorporated by reference hereto, available from Logitech, Inc. of Fremont, Calif., are also suitable for this purpose.

Capacitive proximity sensing, a preferred means of proximity sensing, takes advantage of the fact of a measurable change in capacitance over a sensor when a target is and is not present within its sensing range. If a change from a nominal or initial state is detected, then it is assumed that a target is present. Another suitable capacitive proximity sensor system for use in the invention is available from Freescale Semiconductor, Inc of Austin, Tex. Freescale's proximity controller model MPR08X controls multiple proximity sensors thereby allowing control of several different applications from one sensor. By multiplexing the electrodes, a single sensor is able to detect at multiple points. For example, proximity capacitive-touch sensors manage multiple configurations of touch pads, sliders, rotary positions and mechanical keys for user interfaces.

In addition, other proximity sensors (e.g., Freescale's model no MC33794) may be used which rely on interruption of an electric field, using a low frequency sine wave with very low harmonic content whose frequency is adjustable by an external resistor. Electromagnetic proximity sensing scans a region around an antenna adjacent the input interface, constantly monitoring electromagnetic field changes in the vicinity of the antenna. A self-diagnostic function detects when there is a field change which corresponds to the presence of an object, e.g., a user's finger, near the antenna. In order to allow more discrete detection, multiple antennae can be used.

Still further, a video camera with a defined focus can be used, in which images seen by the video camera are recognized using pattern recognition technology which itself may use artificial intelligence techniques to classify a sensed object. Here, for proximity detection, neural network technology identifies the pattern of an object, classifying the same as a hand, finger, stylus, pointer or an anomaly, for each sensor.

Ultrasonic proximity sensing uses technology found in nature and used by bats to identify and avoid proximate objects in flight. Adaptation of the invention to use ultrasonic proximity sensing is considered within the capacity of someone of ordinary skill in the art when using the present disclosure as a guide.

For magnetic sensors, it is contemplated to include the use of a metal ring or a user glove having metal, magnetic, or plastic parts strategically located to optimize the function of the interface with such sensors resulting in advantageous features such as more accuracy in movement detection, etc. Further, some sensors have adjustments of the nominal range of detection or means to report a graduated detection distance. For such detectors, it is contemplated to enable a user to change parameters (through interaction with a user interface on the computer or peripheral) such that the proximity sensing touch interface detects the target sooner, or later, depending on the user's preferences. Such proximity detectors are disclosed in IEC 60947-5-2, published by the International Electrotechnical Commission, the content of which is incorporated by reference thereto.

Figure 9:
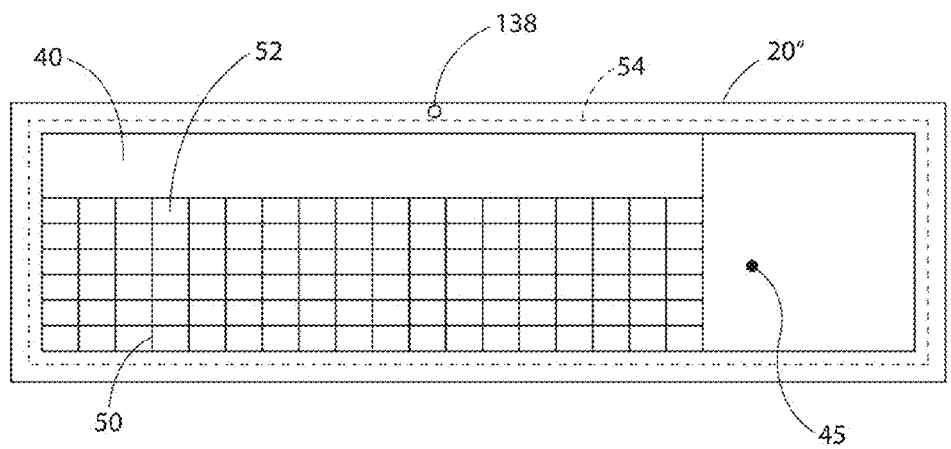
FIG. 9 is a schematic diagram of an embodiment of the system of the invention.

Referring to FIG. 9, a schematic diagram of an alternative MTAC 20" includes a single multi-touch surface 45 made up of the multilayer assembly 60, 60', 60" of the invention.

In one embodiment, optionally, a grid 50 of delineations of key input fields or zones 52 can be pre-printed on the touch surface 40 or 45, or the touch surface can be an integrated touch display screen which displays the delineations of the key input fields or zones. The capacitive touch screen 45 is printed so as to define key fields 52 which, if touched within the field, trigger the registration of the corresponding letter, symbol or command selected. In addition to printing, such fields 52 can be defined by displaying the fields on a liquid crystal touch screen.

Figure 10:
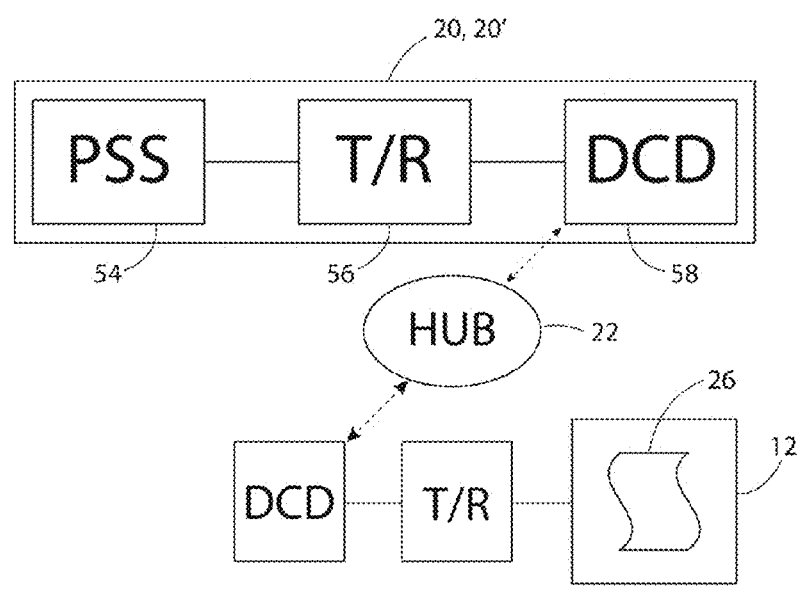
FIG. 10 is a block diagram of the MTAC of an embodiment of the invention

Referring now to FIG. 10, in one embodiment, the MTAC 20, 20', 20" has a proximity sensing subsystem 54 (PSS), a transceiver (T/R) 56 adapted to transmit and receive encoded data according to a communications protocol via IR, RF, "BLUETOOTH"#, "WiFi"™ through a data connection device (DCD, such as an antenna) 58 for communicating data and command signals to processor 12, preferably via the wireless hub 22 (via, for example, a second data connection device and transceiver). In another embodiment, the PSS 54 is optional, and a system in accordance with an embodiment of the present invention may be based on touch (without proximity sensing). The instructions 26 are executable on the processor 12 for receiving data inputs from a MTAC 20, 20', 20". The instructions 26, when data is transmitted from the proximity sensing subsystem 54, cause the display of a virtual representation 33 of the MTAC 20, 20', 20" (or the input field 42, 44 thereof) on the display device 16 along with a virtual representation 32 of the target 36, positioned on the display relative to a representation of at least the input field of the MTAC 20, 20', 20" in an orientation which recreates, in 2D plan view, the real world relative position of the target 36 with respect to the real world MTAC 20, 20', 20". The instructions 26 then cause the reception of data inputs from the MTAC 20, 20', 20" and processing such in a manner appropriate to the class of data transmitted, whether representative of an input letter, word, or command (e.g., shift or control functions).

Figure 11:
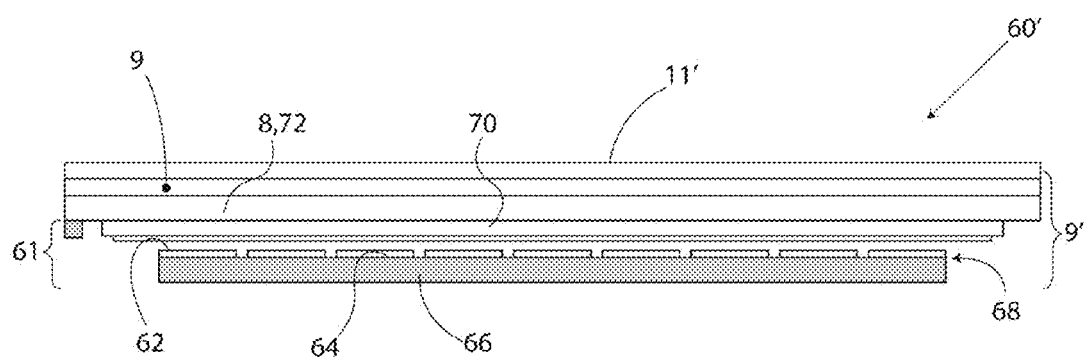
FIG. 11 is a schematic side view of a touch pad module with the proximity hovering feature in accordance with an embodiment of the invention.

Referring to FIG. 11, in an embodiment, the MTAC 20' includes a multilayer assembly 60' with added proximity sensing. The multilayer assembly 60' is made up of a top layer 11', under which is a multitouch module 9'. The multitouch module 9' is made up of the upper pressure sensor layer 9, followed by a touchpad sensor subassembly 61.

The top layer 11' is a flexible touch-sensitive passive LCD display 11' (as already described with respect to layer 11). The touchpad sensor subassembly 61 of the multitouch module 9' may be based on the "TRUETOUCH"™ touchscreen solution available from Cypress Semiconductor Corp of San Jose, Calif. This device integrates capacitive proximity finger hovering functionality.

In such an embodiment, the touchpad sensor assembly 61 has proximity sensors 62 integrated on a surface 64 in a tight array or cluster 68. A thin film backlight 70 (thickness approximately 0.3-0.4 mm available from Modilis "FLEX-FILM"™ of Finland) is added on top of the array 68 of proximity sensors 62, followed by a glass panel 72 (thickness approximately 0.6-0.8 mm), optionally with paint masking to mark input areas, which seals the assembly in a housing (not shown).

Figure 12A:
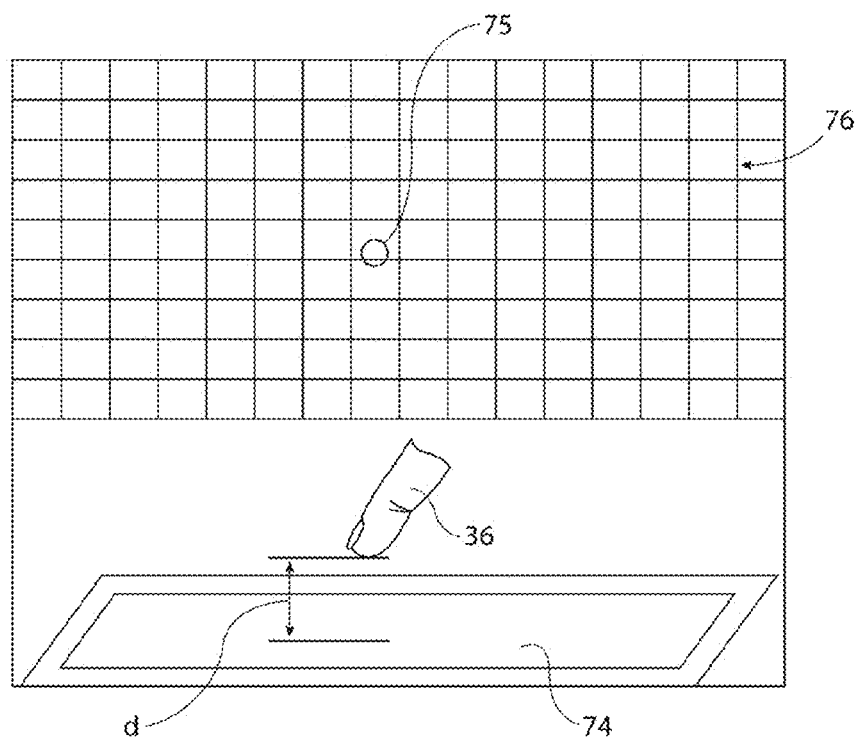
FIG. 12A is a schematic view showing, in the upper portion thereof, a graphical representation of the detected relative position of a hovering finger, the hovering finger shown relative to the input surface in the lower portion thereof.
Figure 12B:
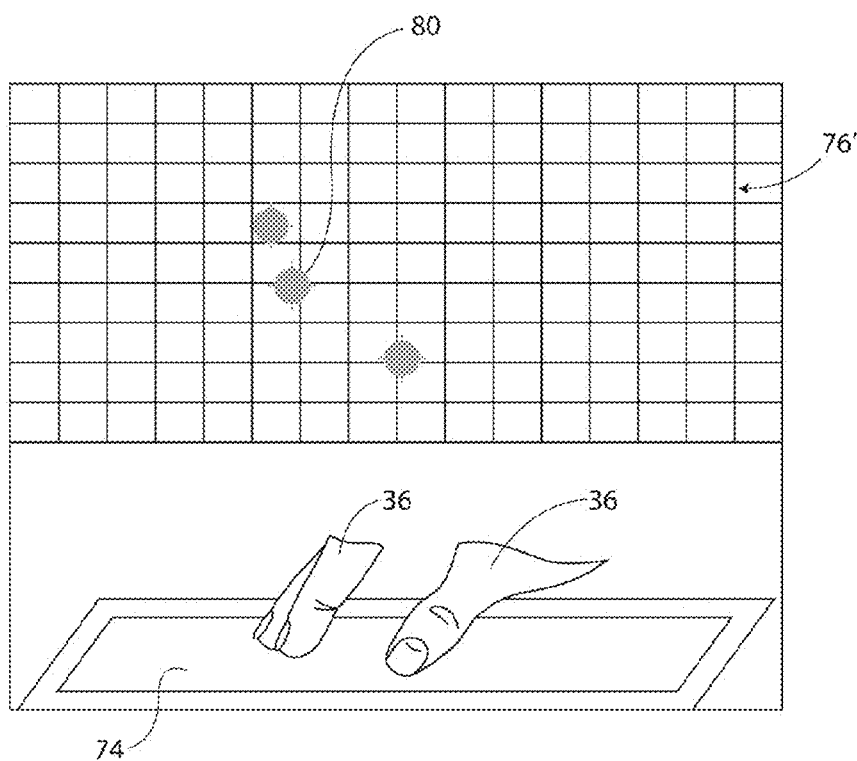
FIG. 12B is a schematic view showing, in the upper portion thereof, a graphical representation of the detected relative position of landed fingers, the landed fingers shown relative to the input surface in the lower portion thereof.

Referring to FIGS. 12A and 12B, in the above embodiment, proximity sensors 62 locate the target 36, in this case a finger, as it approaches the multi-touch surface 74. The circle 75 indicating the relative position of the target 36 on a grid 76 is unfilled when no touch is detected. When proximity has been detected, the circle 75 appears, and its size typically indicates the distance d of the target 36 from the multi-touch surface 74.

In FIG. 12B, when detected targets 36 actually land on the surface 74, the unfilled circles 75 indicating the relative position of the target become filled circles 80. When touch has been detected, typically, the area of contact between the target 36 and the surface 74 is indicated by its actual size or at least relative size with respect to the input surface is maintained.

The processor 12 (whether located in the PC or the MTAC itself) interprets the touch or hover information as shown in the grids 76, 76' above the schematics of the approaching or touching action in the figures. From the grid location, the processor 12 is able to read location, determine whether touch has occurred, discern how many targets 36 are involved as well as estimate the distance d from touch interface that target is and, when a touch is indicated (by the filled circles 80), determine how large a surface is being touched.

Where the MTAC 20', 20" includes a multitouch module 60', 60" therein, data input and the visualization thereof may be performed as described in a number of prior art patents. For example, U.S. patent application Ser. No. 11/696,703 entitled ACTIVATING VIRTUAL KEYS OF A TOUCH-SCREEN VIRTUAL KEYBOARD, the contents of which are hereby incorporated by reference hereto, describe in more detail a method of operating a touch screen to activate one of a plurality of virtual keys. A touch location is determined based on location data pertaining to touch input on the touch screen, wherein the touch input is intended to activate one of the plurality of virtual keys. Each of the plurality of virtual keys has a set of at least one key location corresponding to it. For each of the virtual keys, a parameter (such as physical distance) is determined for that virtual key that relates the touch location and the set of at least one key location corresponding to that virtual key. The determined parameters are processed to determine one of the virtual keys. For example, the determined one virtual key may be the virtual key with a key location (or more than one key location, on average) being closest to the touch location. A signal is generated indicating activation of the determined one of the virtual keys. A signal is generated indicating activation of the identified virtual key. Referring again to FIG. 7, the signal can be the highlighting or glowing of that particular key 82.

Referring to FIG. 13, a table 90 showing representative classifications of inputs in accordance with one embodiment of the present invention is provided. Such should be considered as a typical, nonexhaustive example of input classification. Simple, intuitive action on the part of the user is required in order to distinguish between modes of operation of the MTAC 20, 20', 20". A typical example would be where a single target 36 is sensed by the PSS 54, the inputs received from the MTAC 20, 20', 20" are classified as single inputs of letters, numbers or symbols, preferably augmented by "SWYPE" technology (facilitating gesture based input). Where two targets 36 are sensed spaced apart from one another, the inputs received from the MTAC 20, 20', 20" are classified as command or macro inputs. Where two targets 36 in close proximity to one another are sensed, the inputs received are classified as pointing device control inputs. Such pointer inputs execute a pointer subroutine which processes the data received as pointer data inputs, controlling a cursor on the display screen in any known manner. Such convention provides a transparent input mode to the user.

It should be noted that the inputs made to the MTAC 20, 20', 20" can have any meaning defined by any suitable protocol, and may even be combined with inputs to other input devices (e.g. from standard keyboard inputs to eyelid wink detection, for example) to create new more complex meanings. Further, distinction between inking and keying may be made via the classification process, based for example, on pressure segmentation results, in which a touch point is defined to be a finger or a stylus. For example, upon detection of contact or landing, the size of the "footprint" of the target and/or the associated pressure may be used to classify the input. When a stylus is detected, the MTAC 20, 20', 20" is suitably programmed to disable functionality that is dedicated to keying, such as the overlaying of a virtual keyboard 32 on the remote display 16. Therefore, the inputs classified and recognized may advantageously be used to turn on or turn off functionality to suit the task at hand. This saves memory and processing resources and improves reaction time. Further, detection of inking prompts a query of the user via a popup window, to disable hovering and proximity features, in order to avoid movements in the proximity of the inking surface 11, 11' and 11" being misinterpreted as inking, and further reducing memory and processing resources.

Further, it should be noted that the MTAC 20, 20', 20" may readily be adapted to sense data including proximity, distance, landing speed, touch, contact area, pressure segmentation, pressure distribution, heat, shape, footprint, pattern, capacitance, measured wavelength, biometric data, flux, induction, sound, and conductivity.

U.S. patent application Ser. No. 11/696,701 entitled OPERATION OF A COMPUTER WITH A TOUCH-SCREEN INTERFACE, the content of which is incorporated herein by reference thereto, describes use of a touch screen to detect various user inputs which trigger the display of a virtual keyboard. U.S. patent application Ser. No. 10/903,964 entitled GESTURES FOR TOUCH SENSITIVE INPUT DEVICES, the content of which is incorporated herein by reference thereto, describes the detection of gestures for more complex user inputs, which, depending on the gesture, display a selected virtual keyboard. U.S. patent application Ser. No. 11/696,693 entitled VIRTUAL INPUT DEVICE PLACEMENT ON A TOUCH SCREEN USER INTERFACE, the content of which is hereby incorporated by reference hereto, describes the generation of a display on a touch screen of a computer. In the context of this application, the touch screen is analogous to the display of the display device and, using similar hardware and processing steps, can be used to generate the virtual input device display described herein as the virtual representation of the MTAC or virtual keyboard.

Figure 14:
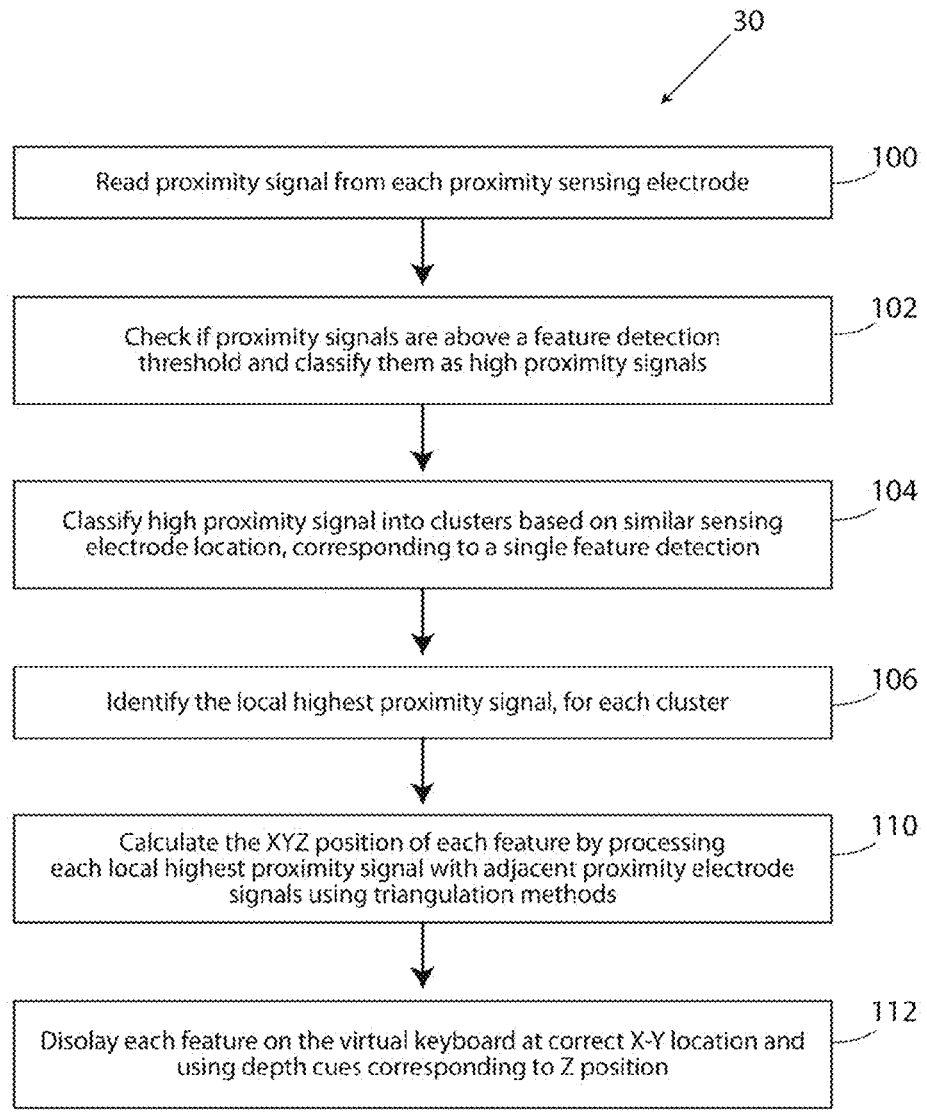
FIG. 14 is a flow chart of a first method of the invention.

Referring to FIG. 14, the method 30 of the invention includes the following steps: step 100, reading proximity signal from each proximity sensing electrode; step 102, checking if proximity signals are above a feature detection threshold and classify them as high proximity signals; step 104, classifying high proximity signals into clusters based on corresponding sensing electrode locations which indicate a single feature detection; step 106, identifying the local highest proximity signal, for each cluster; step 110, calculating the XYZ position of each feature by processing each local highest proximity signal with adjacent proximity electrode signals using triangulation methods; and step 112, displaying each feature on the virtual keyboard at correct X-Y location and using depth cues corresponding to Z position.

Figure 15:
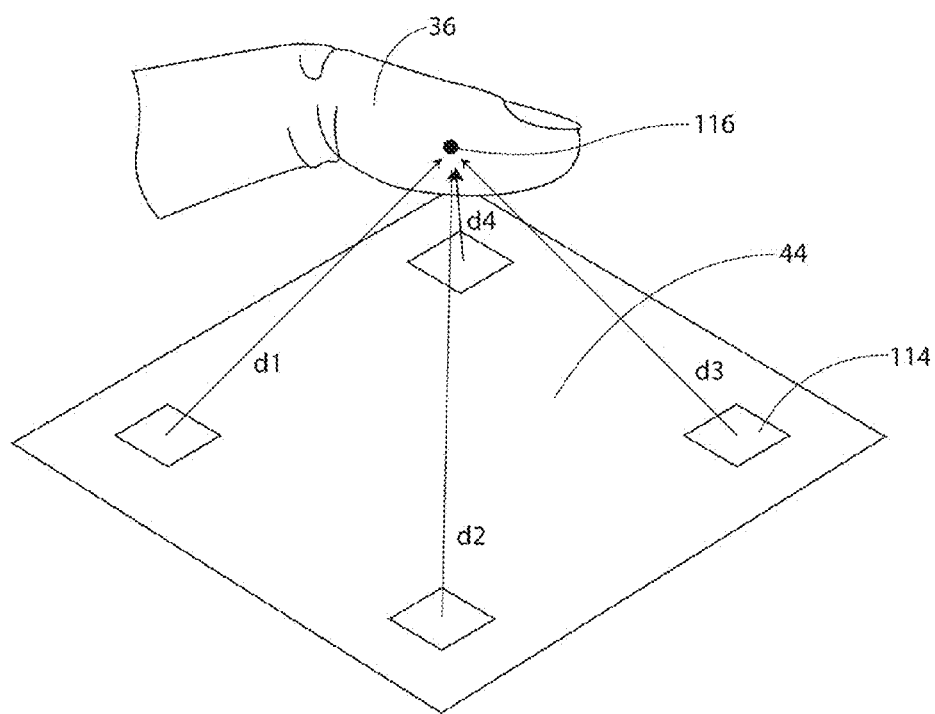
FIG. 15 is a schematic view of the triangulation step in accordance with an embodiment of the invention.

Referring now to FIG. 15, the triangulation of a target 36 using a plurality of proximity sensors 114 is known in the art. Such processes are used for GPS location of objects to calculate a position based detections from several distant satellites. In the figure, location of a target 36 using four proximity sensors 114 is depicted. The target 36 is measured as being a distance of d1, d2, d3 and d4 from the corresponding sensors 114. In order to perform tracking as herein described, a triangulation algorithm is solved based on the corresponding inputs d1 to d4, thus locating the point 116 of the target in 3D space.

Figure 16:
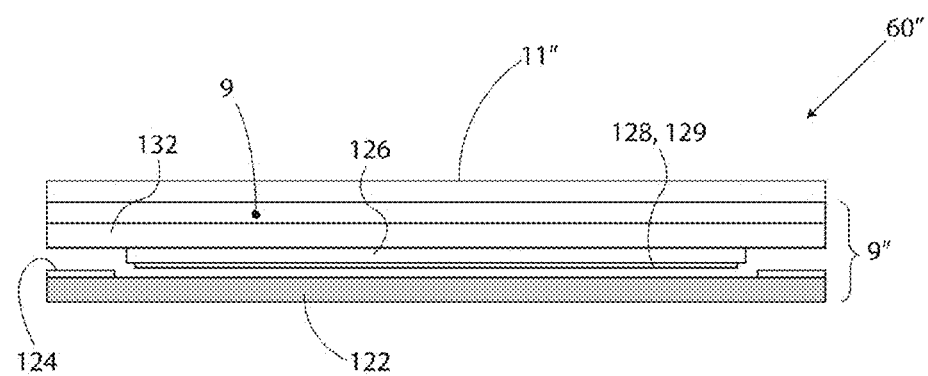
FIG. 16 is a schematic view of a hybrid touchpad module in accordance with an embodiment of the invention.

Referring to FIG. 16, in another embodiment, the MTAC 20" includes a multilayer assembly 60" with added proximity sensing. The multilayer assembly 60" is made up of a top layer 11" under which is a multitouch module 9". The multitouch module 9" is made up of the upper pressure sensor layer 9, followed by a touchpad sensor subassembly 61'. The touchpad sensor subassembly 61' uses a multiple 3D proximity sensing module 120. The module 120 is made up of a PCB 122, proximity sensors 124, a touchpad module 126 having ITO dual layers or a regular touchpad PCB, and a glass panel 8, 132. The PCB 122 has integrated thereon, several proximity sensors 124 arranged in a cluster or an array (which cluster can take the form of a rectangle surrounding the touchpad module 126, described below). On top of the PCB 122 with integrated proximity sensors (or antennae) 124, is a touchpad module 126 itself made up of a touchpad PCB 128. Alternatively, an ITO (Indium Tin Oxide) dual layer 129 may be used. A glass panel is then placed thereon, to seal the assembly within the housing (not shown). In this way, the assembly is able to measure proximity of the target by calculating the 3D position of the target based on the detected distances of the array of sensors (e.g., as illustrated in FIG. 15 above).

Other embodiments capable of tracking a target 36 as it approaches a touch surface 40, 44, 74 use known technology for in tracking moving objects of differing sizes ranging from that of a hockey puck to an airplane. Essentially, these known technologies use proximity sensors in the form of radars which measure distance between the sensor and the target. Where a sufficient number of sensors are used in a cluster, the distance information transmitted can be resolved, using an algorithm running on a processor, to a single target or a minimum set of possible targets. Such suitable tracking technologies are described in U.S. Pat. No. 6,304,665, to Cavallaro et al, U.S. Pat. No. 5,509,650 to MacDonald, WO2005/077466 to Bickert et al, U.S. Pat. No. 5,138,322 to Nuttall, and U.S. Pat. No. 6,292,130 to Cavallaro et al, the contents of which are incorporated herein by reference thereto. The components described therein need only be miniaturized and adapted for use in tracking targets as they approach a touch surface or keyboard.

In a further embodiment, movement detection technology in video images, such as that described in U.S. Pat. No. 6,760,061, to Nestor, Inc, the content of which is incorporated by reference, may be used to recognize an object by tracking changes in luminescence in defined tiles across the video image taken of the user's hand above the input device, whereas selection of particular keys is sensed by traditional capacitive touch sensors. Consequently, a single video camera embedded in the MTAC 20" can sense the position and movement of targets 36 above the MTAC which, together with a processor 12 and instructions 26' operating thereon, are first inverted (e.g., step 154 of the method 140 below described in connection with FIG. 17) and processed before projection for optimal, rapid display, preferably in transparent mode over the virtual keyboard 33 on the display 16. A pattern recognition step or steps (e.g., steps 144 and/or 146 of the method 140 below described in connection with FIG. 17) may be performed in which a user's hand is recognized according to the shape viewed and classified as a hand in which a particular finger is likely to be closest the keyboard or touch interface 40, 44, 45 (after comparison with stored shapes of hands representative of hands having a particular extended finger for example). Such particular finger may then be associated with the closest sensed object to the capacitive sensors and so this portion of the sensed hand is registered to the closest finger location, thereby allowing an accurate overlay of the hand image 32 on the virtual input area 33. In such a case, the transparent image 32 used for the target 36 may be an actual video image of the target captured by the video camera 138.

Figure 17:
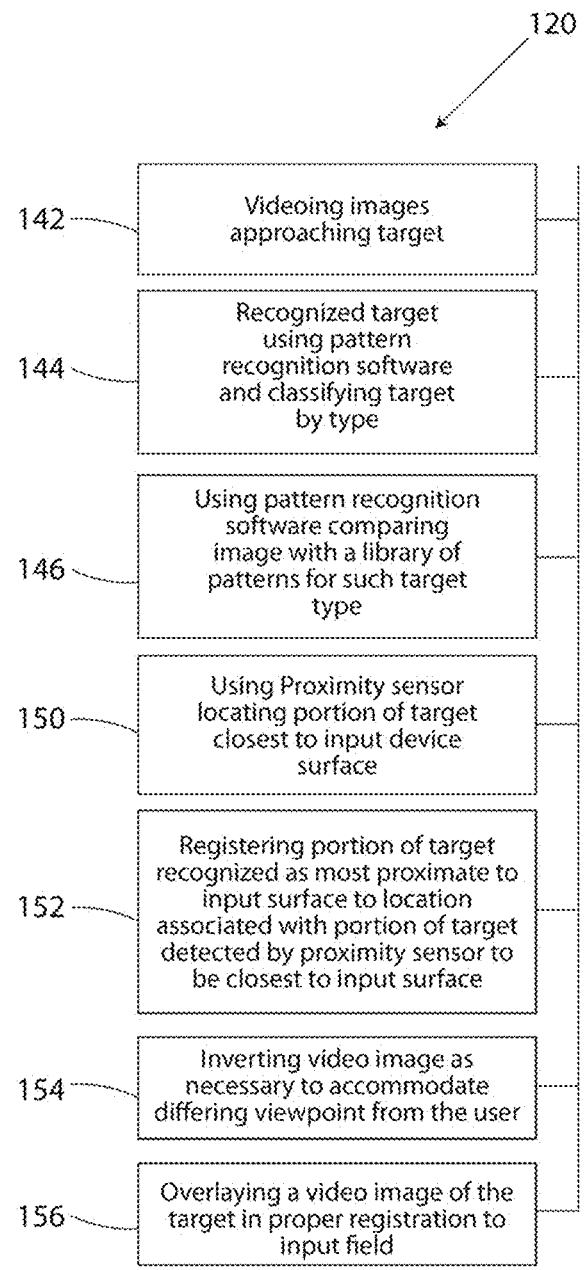
FIG. 17 is a flow chart of a second alternative method of the invention.

Referring to FIG. 17, in more detail, the method 140 for recognizing and projecting video images 32 of a target 36 includes several steps. In a first step 142, the target 36 is videoed as it approaches the input field 40, 44, 45, 74. In a second step 144, the target 36 is recognized using pattern recognition software and classify by type. In a third step 146, using pattern recognition software, the image is compared with a library of patterns for such target type and the type identified (together with associated subpatterns). In a fourth step 150, using proximity sensors 54, 62, 114, 124, the portion of the target 36 closest to input device surface 40, 44, 45, 74 is located. In a fifth step 152, the portion of the target 36 recognized as most proximate to input surface 40, 44, 45, 74 is registered to the location associated with the portion (e.g. 116 of FIG. 15) of the target 36 detected by proximity sensors 54, 62, 114, 124 to be closest to input surface 40, 44, 45, 74.

In a sixth step 154, the video image is inverted as necessary to accommodate a differing viewpoint from the user. In a seventh step, the video image of the target is overlaid in proper registration to input field, preferably in transparent mode.

In another embodiment, the processor 12 includes instructions in an instruction set for automatic system activation when the proximity sensor 54, 62, 114, 124 detects a target 36 in appropriate proximity to the MTAC 20, 20', 20". Upon automatic system activation, a representation 32 of the target 36 is displayed on the display 16. Further, optionally, upon automatic system activation, a representation 33 of the input field 40, 44 is displayed on the display 16. Sensing of proximity of a target 36 to the MTAC 20, 20', 20" triggers the display of a virtual representation 33 of at least the input field 40, 44, 45 of the MTAC on the display 16. Where the proximity sensor 54, 62, 114, 124 remains active even in sleep mode, such sensing can be used to power up the MTAC 20, 20', 20", or to activate otherwise power consuming functionality (such as an illumination feature, a backlighting module or a local display), in a system ready mode. Further, when a user 34 sees his virtual finger 32 appear on the display 16, then he can adjust the position of his virtual finger relative to the virtual input field 33 without ever having to glance at the physical MTAC 20, 20', 20" or his own finger.

In another embodiment suitable for allowing a presenter to virtually gesticulate before an audience with his hands or arms, the proximity sensing subsystem 54 detects multiple targets 36 and transmits relative location data dynamically, in real time to the OS 24 of the PC 14, for display of multiple fingers of one or more hands over the virtual MTAC 33, so as to further allow a user to focus their eyes only on the display 16 in order to better understand and correct his or her finger motions so as to improve his or her input throughput into the system of the invention. This ability of focusing only on the computer display should reduce eye fatigue usually caused by having to glance at the physical input device and then refocus on the more distant computer display. In addition, such an embodiment overlays the detected hands or arms on the display 16 which although physically distant from the user 34, is nonetheless the focus of the audience's attention, thereby facilitating communication for such presentations.

In another embodiment, the system 10 and method 30, 140 of the invention permits sizing, relocation and hiding of the virtual representation 33 of the MTAC 20, 20', 20" on the display 16 in a conventional manner, such as clicking to close, resize or move a window.

In another embodiment, the virtual representation 32 of the target 36 is displayed on the display 16 in a 2D plan view using various cues such as distance/depth cue such as: variation of the target size, variation of the target color and/or transparency, variation of the target shadow relative position, variation of the target shadow color and/or transparency, variation of the target shadow blur and displaying arrows encoding the distance between the target and the touch input device surface. Sound may also be used, where the sound varies as the target approaches or retreats from the MTAC 20, 20', 20".

Such virtual representation 32 of the target 36 may be a simple abstraction thereof, such as a mouse cursor but may also be any other shape such as a simplified representation of a human finger. A suitable virtual representation 32 of a human finger may be an elongated rectangle (not shown), with a rounded or pointed input end, which, for simplicity is projected on the display 16 in a vertical orientation. In such an embodiment, the relative location of end of the rectangle corresponding to the input end of the target is of importance. The opposite end is presented for visual comprehension only (i.e., that such representation is that of a finger).

Inking Capture

In inking mode, the user interacts directly (direct interaction) with the device surface (as opposed to a graphic tablet where the user does not look at the pen tip and looks instead at the PC, this is a so called indirect experience).

While the user is inking, the PC 14 is receiving the pen tip activity (stylus location, pressure, type) and stores this activity in the PC internal memory as a stream of data. After drawing completion, the PC 14 produces an equivalent drawing, either in the form of vector, bitmap, or other format (knowing the stylus tip trajectory and pressure allows building a computer model similar to the actual drawing as displayed on the ink display). Building the equivalent drawing based on the stylus tip activity is achieved in the PC 14 thanks to special software referred to as the drawing reconstruction program.

When using the MTAC 20 in inking mode, the stylus 15 leaves a trace on the inking display thanks to the special LCD passive display technology. The stylus tip is also tracked in real time with a resistive pressure sensor located below the inking display. Hence the drawing on the display can be reconstructed independently thanks to all the pressure activity packets transmitted to the PC 14.

The pressure activity (location and pressure amount, type . . . ) is transmitted to the PC 14 immediately as it occurs (on-the-fly). Alternatively it is stored in the MTAC 20 and then transmitted as a whole when the process is finished (see below). Timestamps define the instants when the pressure activity takes place. They can be transmitted as part of the activity packet. This allows reproducing the "film" of the drawing, making possible later editing of the drawings, for example by changing the color of the strokes that took place between time A and time B. Alternatively, no time stamps are transmitted; instead the approximate time of data reception, as measured by the PC, is used.

At the end of the drawing process, the user is satisfied with the drawing, and initiates the "activate" gesture or equivalently a mechanical button, which brings the display back to its initial blank state and signal this event to the computer. Erasing the inking display is a feature available with passive LCD technology. In some implementations, generating multiple voltage pulses of different polarity and voltage brings the passive LCD display in its erased state.

The embedded pressure sensor detects the gestures such as the pre-defined activate gesture. For example, the activate gesture is a double 3-fingers tap. The activate event (from button or from gesture) is also sent to the PC 14. This event launches a pre-defined target application, reconstructs the drawing, and pastes the drawing in the defined application. Possible target applications include graffiti in FACEBOOK™, digital Post-It, messaging applications.

Activity information packets are stored in the PC 14 or in the MTAC 20. If the pressure activity packets are transmitted continuously as the user is drawing, activity packets are stored in the PC 14. If the pressure activity packets are stored in the MTAC 20 during the drawing process, the packets are sent as a whole after the activate event is detected. Storing all activity in the MTAC 20 can be beneficial as it allows a drawing to be acquired even when the PC 14 is in its OFF state. The activity information is then transmitted only when a PC 14 is linked to the device. Expanding on this, multiple drawings can be stored locally while the PC 14 is in OFF state, each drawing being stored by a new activate gesture or button push.

In an alternative use case, the user may desire to draw with a real pen on real paper.

The same device can be used in this case: simply apply a sheet of paper onto the device sensitive surface thanks to the embedded clip mechanism. Draw on the paper (note the passive LCD below the paper—if present—will also be marked by the pen action on the paper). When finished, the user removes the paper, and pushes the activate button or gesture, as in the case where no paper is present. Adding paper brings a more natural pen on paper interaction that some users will prefer. For this use case, the passive LCD display needs not be mounted on the device for further cost savings.

Finger Control

Inking on the MTAC 20 allows for a direct interaction. Finger control, on the other hand, is based on indirect interaction. Mouse cursor control is an example of indirect interaction, in that moving the mouse moves a cursor, which in turn controls a GUI. Likewise, each finger controls a graphical object, which interacts with other controls in the GUI. The finger icons are shown on the PC 14 active display.

While fingers are located on the MTAC 20, their activity is tracked. In one embodiment, this is based on information obtained from the pressure sensor. Based on the pressure maps delivered by the sensor, the finger location and pressure can be determined. In other embodiments, this tracking of finger activity is based on other information, such as that obtained from proximity sensors (instead of or in addition to pressure sensors). Other ways of tracking a finger (or other target) activity may be used. It is to be noted that embodiments of the present invention are not limited to a specific manner of tracking finger/target activity. For each finger detected by the MTAC 20, a graphical object representative of the finger and its attributes (finger icon 13) is displayed on the PC active display. Moving the finger moves accordingly the finger icon 13. A finger/target icon display program monitors the finger state and updates the display in a manner that transcribes the finger activity, such as finger position, applied pressure, and orientation. This program reads touch points data transmitted from the MTAC 20 via its interface, or alternatively processes the complete pressure map and determine the touch after the complete pressure map has been sent to the PC 14 via its interface.

Referring now to FIG. 18, the finger activity is displayed on a transparent overlay, e.g., the fingers are made visible on top of the regular GUI 16 (Windows, Mac, Chrome . . . ). This environment is visible as if the overlay was not present, except obviously for the added finger icons 13. The finger icons 13 on the display device 16 move in real time as per the real finger location on the MTAC 20.

Finger Icons with Pressure Feedback

Referring now to FIG. 19, a simple graphical transcription of the finger activity is to display a colored circle 170 (constant diameter) at a location corresponding to the actual finger location. A cross 172 is located in the center.

The circle 170 can be made thicker when the finger pressure is increased, as described in FIG. 19. The line thickness is measured by dR 174, namely deltaRadius, the difference between external and internal radius.

Representing Pressure: Any value between light pressure and hard press are shown graphically by filling the circle 170 that represents this finger 36. Filling the circle 170 starts from the outside towards the center.

Pressure display sensitivity (alpha in FIG. 19) can be set as a parameter. This parameter defines how much pressure is needed to fill the circle 170. Note that filling (e.g. dR) versus applied pressure need not be a linear function. In the linear case, the line thickness dR is alpha multiplied by the applied pressure, where alpha is an adjustable constant value.

Other methods to represent pressure can be used, for example by filling the circle 170 from the center up to the circle radius. All are showing a progressive effect as the pressure builds up. The function circle filling versus applied pressure is monotonic.

Representing State: Each finger 36 can be either active (enough pressure is applied) or inactive (little pressure). The state may be encoded with a different color (or by grayscale differences).

Active: Blue circle with an adjustable transparency (parameter). Active color can also be adjusted as a parameter.

Inactive: Grey circle with intensity and an adjustable transparency. Inactive color can also be adjusted.

Other methods to represent states are possible, by changing some graphical attribute, shape, color, or transparency. Alternatively, or in conjunction, transition from inactive to active and vice-versa can be highlighted by audio feedback, such as clicks or other sounds.

Figure 20:
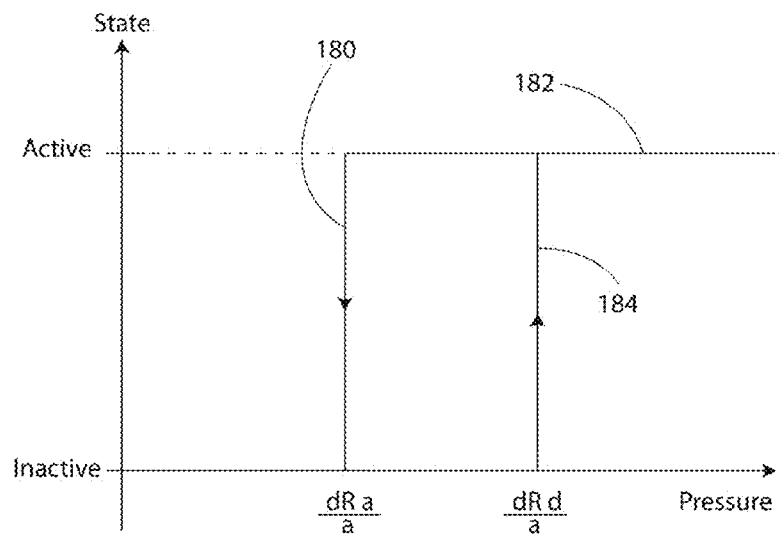
FIG. 20 is a chart of pressure vs. state of a contact surface in accordance with one embodiment of the invention.

Referring now to FIG. 20, there is a first threshold 180 to distinguish when a finger 36 enters the active state 182. Call this threshold 180 "dRa" (for deltaRadius_Activate), where dRa can be adjusted as a parameter. The pressure associated to dRa is simply pressure which exceeds dRa/alpha. Optionally, there is a second threshold 184 to distinguish when too much pressure is applied and a finger 36 leaves the active state 182. Call this threshold 184 "dRd" (for deltaRadius_Deactivate), dRd can be adjusted as a parameter. The pressure associated to dRd is simply dRd/alpha. Optionally, a warning message may be triggered upon reaching pressure threshold 184, to help avoid damage to the MTAC 20, 20', 20".

When the fingers 36 are in contact with the active surface 40, 44 of the MTAC 20, 20', 20", the display 16 is updated accordingly, but there is no net effect on the GUI. In order for a finger 36 to become active and have an effect on the GUI 16, more pressure is applied. When active, a finger effect from a user perspective is the same as if a real finger was located on the screen at the displayed location and the active display was actually a touchscreen. This method allows easy transition from touchscreen direct interaction to finger control indirect interaction described in this invention. A user trained to touchscreen direct interaction, as for example by using a touchscreen in Windows 7 will immediately apply his skills to the MTAC 20 in finger control mode, getting similar performance, but with the additionally benefits that the body posture is much more comfortable, that there is no longer any visual occlusion on the target (precise control is facilitated), and finally the PC screen is not spoiled by finger traces.

Touchscreen Event Generation

A touch digitizer virtual driver used in the invention is a driver that behaves as if digitizer or equivalent touchscreen hardware were present. It generates equivalent events or messages (again, even though no digitizer or touchscreen are physically present—from the operating system perspective, there is no way to distinguish if the event or message is generated by a "real" hardware or by a "virtual" hardware simulated in the virtual driver).

When a touch point is detected as active, the finger icon display program signals the activity of the active touch points to the touch digitizer virtual driver, such activity including for example touchdown, touchup, or touchmove. In one embodiment, the finger icon display program and the virtual driver are combined.

The virtual driver issues touchpoints messages (in Windows 7, WM_TOUCHDOWN, WM_TOUCH_UP, WM_TOUCHMOVE) including their virtual touch coordinates computed by scaling touch points physical coordinates on the active surface by a factor equal to the ratio of display device dimensions to the device active surface dimensions (e.g. the equivalent scaled coordinates on the active screen rather than the MTAC 20 physical coordinates).

Overall, the user can see where his fingers are located on the screen before activating the touch message, and will benefit from the OS 24 native touch digitizer support.

This description builds on the 10 GUI concept (see www.10gui.com), but describes a method to display the fingers 36 with help of a transparent overlay, to provide feedback on the finger-applied pressure, and to produce touch digitizer equivalent events.

Control Board

Referring now to FIG. 21, a block diagram of the control board 200 is shown. A power management block 202 generates the required supply voltages for the other blocks. Batteries are connected to this block 202 in order to supply energy to the system 200. A microcontroller 204, called μC in the following, has M outputs controlling (e.g. driving as they are connected to internal binary voltage sources or to internal DAC outputs) the columns 206 of the pressure sensor panel 212. Furthermore, it has N inputs (e.g. receiving as they are connected to an internal ADC), which are connected to the rows 210 of the pressure sensor panel 212. Two buttons are connected to μC input, in order to detect user action on these. The μC 204 also controls a block called LCD control 214, thanks to some control lines dC (dark control, with result when asserted that the display gets uniformly dark) and bC (bright control, with result that the display gets uniformly bright). The LCD control 214 generates high voltage pulses (positive and negative) on the lines topC and bottomC that are connected to top and bottom layers of the Reflex LCD display 216. By activating single polarity only, or both polarities, for high voltage pulses, the net result is an erased display with either bright or dark appearance. Finally, in the illustrated embodiment, a RF stage 220 emits and receives via its 2.4 GHz channel the information flowing from and to the PC. Other embodiments use, for example, a USB interface and a cable.

Scanning Process

Figure 22:
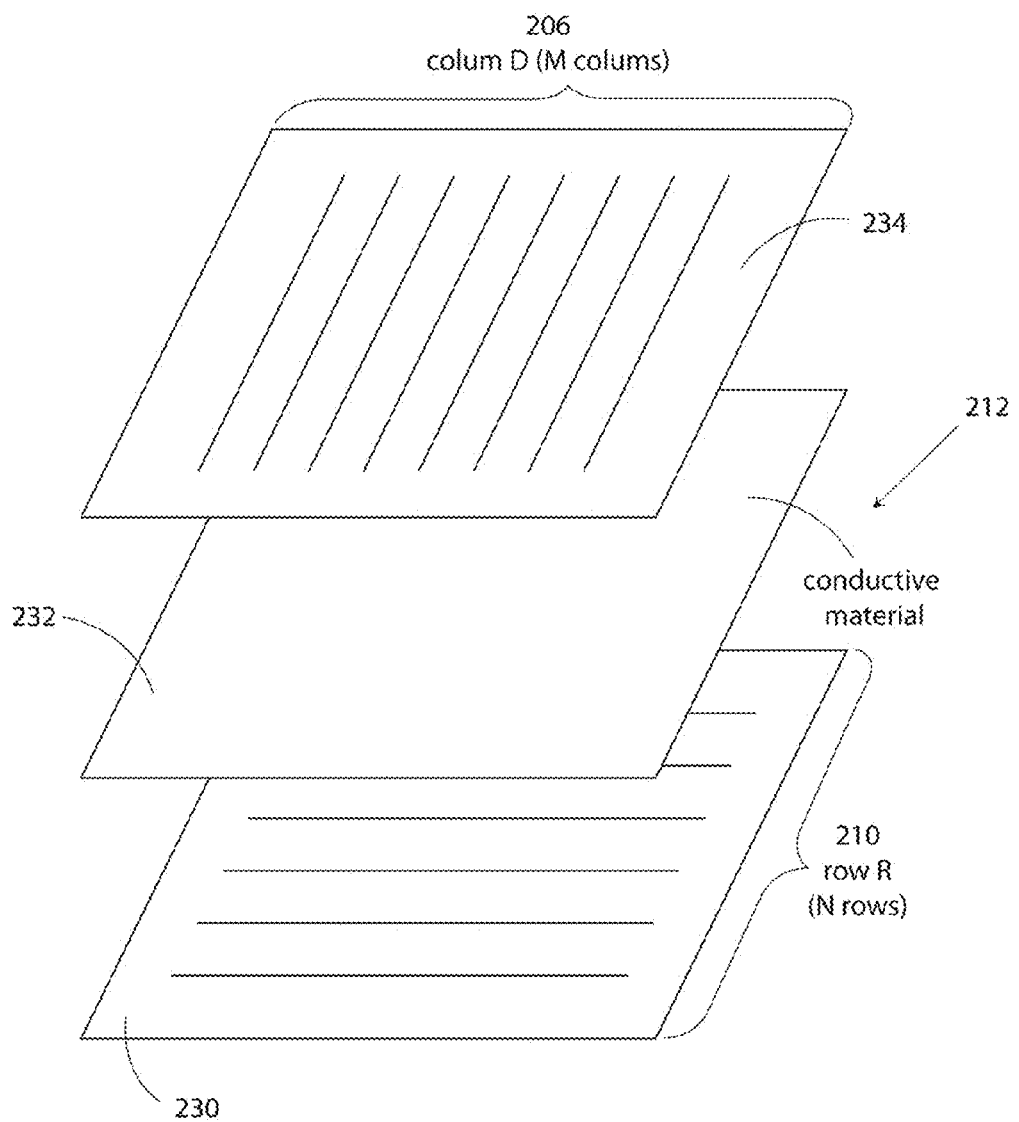
FIG. 22 is an exploded view of the note pad in accordance with one embodiment of the invention.

Referring now to FIG. 22, a passive sensor panel 212 is shown. It consists of a lower flexible membrane 230 with conductive rows 210 facing upward, a separation layer 232 built of conductive material such as carbon ink, and an upper flexible membrane 234 with conductive columns 206 facing downward. In an alternate embodiment, carbon ink is deposited on both lower and upper flexible membrane such that when the membranes are laminated together, the 2 carbon ink layers come into both physical and electrical contact. Given this construction and the carbon electrical properties, the electrical resistance R between each pair of row 210 and column 206 will decrease based on pressure applied at the crossing of said row-column pair.

To measure the electrical resistance at each crossing of row-column, a voltage is applied between said column 206 and ground, and the current flowing into the row 210 is measured. The resistance is then obtained by dividing the applied voltage by the current flowing into the row 210 (typically measured with help of a transimpedance amplifier, which drives the row terminal to ground). On existing resistive touchscreens, driving the voltage on each column 206 is sequential, and so is the readout of the current flowing into each row 210. Sequential activation is needed to evaluate the conductance for each cell in isolation (a cell being defined by the area nearby the crossing of a column-row). Inactive column 206 and rows 210 are usually maintained at a 0V potential. This sequential scanning limits the scan rate. For example a 16 column×16 row matrix has 256 pressure cells (if the pitch is 4 mm, the active area is then 6.4 mm×6.4 mm). If N inputs can be acquired simultaneously (N acquisition stages in parallel), the scanning rate is M×T. If N inputs are acquired sequentially (one acquisition stage and an N-to-1 demultiplexer), the scanning rate is then N×M×T. T is the measurement duration of a single cell. In order to reach sufficient rate, usually above 50 Hz, the measurement duration T needs to be very small, at the expense of signal-to-noise ratio ("SNR"). Having insufficient SNR results in noisy measurements, which in turn results in pressure fluctuations and/or inability to detect touchpoints applied with very low force. To improve SNR, filtering could be applied, thus reducing the signal bandwidth and noise. However, a narrow bandwidth filter requires a longer measurement duration T for the filter to settle down, which would negatively impact the scanning rate. Similarly, averaging multiple readouts would improve the SNR but with the same impact on scanning rate. Thus, in typical sequential scan systems, adequate SNR is obtained at the expense of a large T duration, in a scan rate below the desired rate of 100 Hz to 200 Hz, especially when larger active area are desired. Hence there is a need to increase the measurement rate without sacrificing the SNR.

The approach developed below is inspired by smart antennae technology known as multiple input, multiple output ("MIMO") technology in that all columns 206 are driven at the same time but with a known temporal pattern for each column.

Given that the separation layer 232 is a linear medium, the current injected in each row 210 is the sum of the current contributions generated by each column 206 in isolation. There is a need to separate the individual contribution from each column drive source out of the total current.

Figure 23:
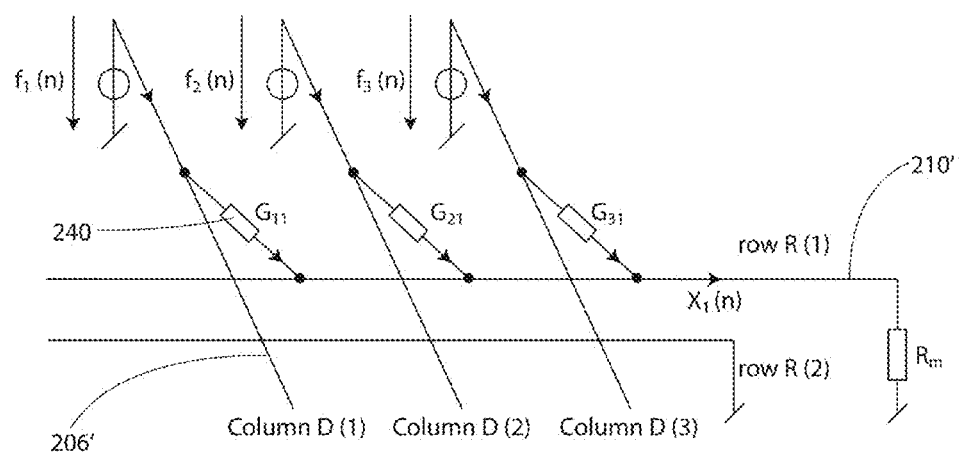
FIG. 23 is an electrical schematic diagram of a notepad in accordance with one embodiment of the invention.

Referring now to FIG. 23, the total current flowing in rowR(1) 210' is the source of multiple contributions from columnD(1) to columnD(3) 206' drive voltage sources (only columnD(1) to columnD(3) are displayed, whereas up to M columns can be driven at the same time), as shown by 3 resistors 240 connecting columnD(1) to columnD(3) to rowR (1), each having a conductivity G11, G21, G31, respectively. In this embodiment, neighboring rows (rowR(0), not shown, and rowR(2)) are connected to ground during measurements of rows 1, 3, 5, . . . (all odd rows). Likewise, odd rows 210 are set to ground when even rows are measured. This multiplexing of measurements for odd and even rows 210 is implemented with help of N/2 analog two-to-one demultiplexer (not shown), each with 2 inputs and 1 output. The 2 inputs are odd and even rows successively, and the output is connected to the μC ADC input (one of N/2) also successively; the select signal to the multiplexer is controlled by the μC 204 in order to measure odd or even rows alternatively, as per the programmed scanning sequence.

In another embodiment, all rows 210 are measured at once and neighboring rows are not connected to ground. In that case, the N rows are directly connected to the N analog ADC inputs of the μC, as shown in FIG. 21. In order to measure the current into row i, a load resistor Rm can be connected between row i terminal and ground, and the voltage across Rm is then proportional to the current. Alternatively, a transimpedance amplifier (not shown), providing a virtual ground to row i terminal, is used. The transimpedance acts as an ammeter as its voltage output is directly proportional to the current flowing into its input.

Separating the contribution from each column voltage source is made possible by the use of a special set of modulation functions, each modulating the driven voltage applied to the columns 206. The emitted column drive signal for column i is a square-integrable function called f_i(t), i=1 . . . M. By design, the set of functions f_i(t) form a set of orthogonal functions, meaning that a projection of one function on another function is zero, e.g. inner_product(f_a(t), f_b(t))=0 for a and b not equal. Multiple families of orthogonal functions are described in the literature, such as the Walsh functions, the Haar functions, or other wavelets functions. In the example above of a 16×16 matrix, a set of 16 Walsh functions selected among the first 32 functions are used. The selection criterion is based for example on suppressing Walsh functions having many contiguous bits in either +1 and −1 output state. Other optimization criteria can be used to select the best functions among a larger set of orthogonal functions.

The receive signal for each row 210 (which is the sum of current contribution from each column 206) is cross-correlated with each one of the multiple modulation function, yielding a total of M sets of measurements for each row. The method works equally well for both continuous-time and discrete time signals, but we describe here the discrete time case for ease of explanation and implementation. Let's define x_j[n] the measured waveform from row j at instant n (square bracket indicates the time index for discrete time signals). Cross-correlation output of the measured waveform at row j with drive at column i is y_ij[n]. It is defined for x_j[n] and f_i[n] for an arbitrary index n by:

$$y\_ij[n]=\Sigma(x\_j[k]*f\_i[L-(n-k)])$$

where $\Sigma$ applies to k from − infinity to + infinity.

It is assumed that the modulation function f_i[n] is of duration L (f_i[n] is 0 for n<0 and n>L), hence the following holds true:

$$y\_ij[n]=\Sigma(x\_j[k]*f\_i[L-(n-k)])$$

where $\Sigma$ applies to k from 0 to 2L.

y_ij[n] can be understood as the result of convolution of the measured row current with a matched filter having impulse response equal to the time reverse of the modulation function f_i[n] (to which a time shift of value L is further applied). Matched filter has the desirable property to maximize the SNR when trying to detect a signal in random noise. The matched filter as defined here is optimized for white noise, a good model for the environment described here. For other type of noise, a similar matched filter definition can be obtained, as defined by the theory of matched filter further taking into account the autocorrelation function of the noise.

As will be apparent to those skilled in the art, the matched filter operation not only minimizes the impact of noise but also completely eliminate current contributions from the other columns voltage drive. This is a direct result of using a set of orthogonal functions and the linear nature of the resistive separation layer.

The value of y_ij[n] for n=L is the dot product (or inner product) of x_j[n] and f_i[n]. Let's call it Y_ij.

$$y\_ij[L]=Y\_ij=\Sigma(x\_j[k]*f\_i[k])$$

where E applies to k from 0 to L.
Likewise, the dot product of f_i[n] with itself is $$F\_ii=\Sigma(f\_i[k]*f\_i[k])$$

where E applies to k from 0 to L.

Both Y_ij and F_ii are the projection of the signals x_j[n] and f_i[n] on the signal subspace defined by f_i[n].

The conductance of cell (i,j) is G(i,j), the conductance between column i and row j. It is the ratio of the current contribution in row j from column i divided by the voltage applied to column i, as in the following formula:

$$G(i,j)=Y\_ij/F\_ii$$

Based on the scan process (alternative odd/even rows or all rows jointly), the complete sets of G(i,j) can be computed in either one or two scans. A scan operation involves driving the columns with the complete drive function f_i[n] of duration L, simultaneously acquiring the total current x_j[n] for N or N/2 rows, then after drive completion (2 scans for the latter), the cross-correlation computation is activated in the μC program, from which all values of G(i,j) are estimated and stored in internal memory.

Other methods of estimation can be used to find the value of parameter G(i,j) based on the total current x_j[n] in row j and the applied voltage f_i[n] on column i, all of them using the orthogonal nature of the drive voltage functions. Since the overall system is linear, many approaches described in linear system estimation can be used. Such methods include LSE "least square estimates", either in the form of batch estimate (process the whole set of data from a given scan) or recursive estimate (LMS, RLS, Kalman filter), the later case allowing refining estimates based on previous estimate and a new set of data. Given that G(i,j) are not time-invariant when the pressure varies, the recursive estimate must be fast enough to track the user defined variation of G(i,j).

The set of conductance are computed for each cell (i,j). Since the material in the separation layer has a conductance that grows with applied pressure, the two-dimensional (2D) map of conductance as stored in the μC internal memory can be used as a good approximation of the 2D pressure map.

Pressure Map Segmentation

The 2D pressure map reports the amount of pressure on each cell of the pressure sensor. In order for inking or finger control to take place, there is a need to convert this map into a list of touch points. The first step is to segment contiguous zones of non-zero pressure into blobs. This is a well-covered technique, and is described in http://en.wikipedia.org/wiki/Blob_detection, the content of which is incorporated herein by reference thereto.

As an alternative, image segmentation can be applied, as described in the Appendix attached hereto. Each segment of the pressure map (touchpoint) is categorized (based on the segment dimension) as either one of:
1. Pen tip
2. Finger
3. Palm For segments of type "Pen" and "Finger", the segmented pressure profile is further modeled by a 2D Gaussian or elliptic distribution. The outcome of the model fitting provides more attributes to the segment under consideration:
1. Center (2D)
2. Orientation of major axis
3. Major axis radius
4. Minor axis radius
5. Peak (pressure) value.

The output of the segmentation process is a list of active touchpoints including all their attributes.

For inking application, the distribution center (including fractional accuracy) is identified to be the pen tip position and the peak value is directly linked to the pen pressure. Tip position and pen pressure allow for a good reproduction of the drawing on the passive LCD to be stored in the PC 14.

For finger control application, the equivalent ellipse is drawn on the active screen, as described above (description above covers circle objects, but ellipse at a given orientation can be used for more realistic finger representation).

In another embodiment, a sensing subsystem senses an object on the MTAC 20 which triggers the display of a virtual image 32 of the MTAC 20 on the computer display screen 16. Such sensing can be used to power up the MTAC 20, or to activate otherwise power consuming functionality, in a system ready mode. Further, when a user sees his virtual finger 32 appear on the computer screen, then he can adjust the position of his virtual finger relative to the virtual MTAC 20 without ever having to glance at the physical MTAC 20 or his own finger.

In another embodiment, the sensing subsystem detects multiple fingers and transmits relative location data dynamically, in real time to the OS 24 of the PC 14, for display of multiple fingers of one or more hands over the virtual MTAC 20, so as to further allow a user to focus their eyes only on the computer display screen in order to better understand and correct his or her finger motions so as to improve his or her input throughput into the system of the invention. This ability of focusing only on the computer display reduces eye fatigue usually caused by having to glance at the physical input device and then refocus on the more distant computer display.

In another embodiment, the system and method of the invention permits sizing, relocation and hiding of the virtual MTAC 20 image on the display 16 in a conventional manner, such as clicking to close, resize or move a window.

Figure 24:
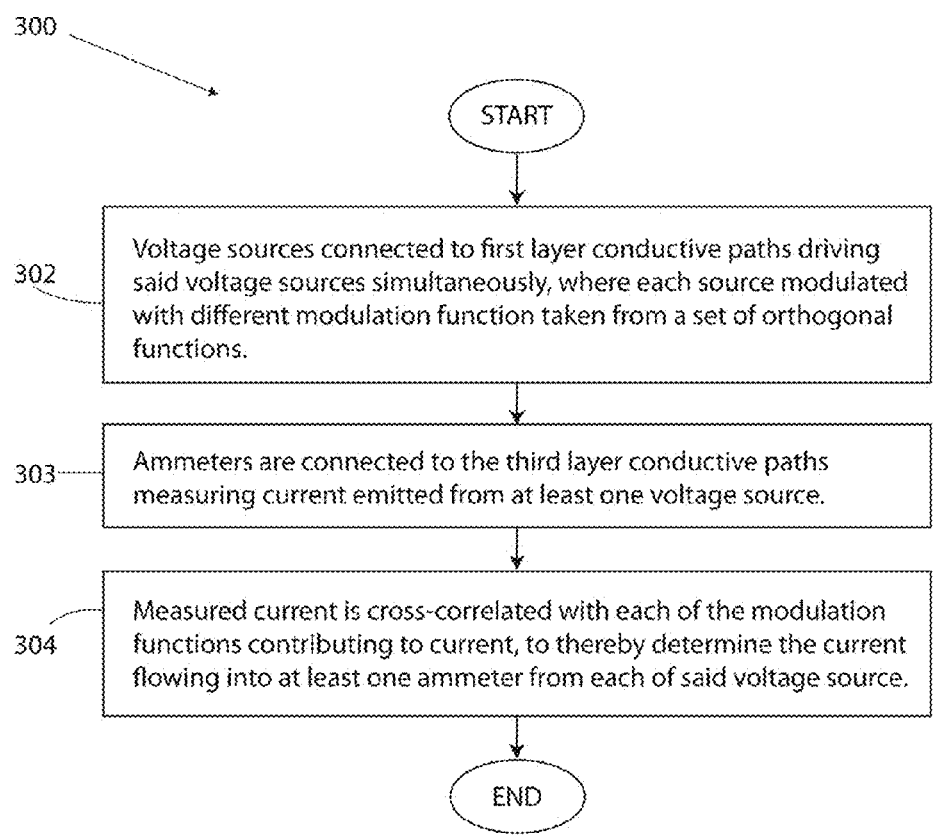
FIG. 24 is a flow chart of a method of operation of the pressure sensor layer in accordance with one embodiment of the invention.

Referring now to FIG. 24, in an embodiment, a method 300 of operation of the pressure sensor layer 9 of the MTAC 20, 20', 20" includes several steps. In a first step 302, the voltage sources are connected to the first layer conductive paths, driving said voltage sources simultaneously, where each source is modulated with a different modulation function, said modulation function taken from a set of orthogonal functions. In a second step 303, the ammeters are connected to the third layer conductive paths, measuring current emitted from at least one voltage source. In a third step 304, measured current is cross-correlated with each of the modulation functions contributing to current, to thereby determine the current flowing into at least one ammeter from each of said voltage source.

In a feature of the invention, a user experience is created of using a touch screen display device remotely from such device, without requiring that the user touch the display and further not requiring a touch screen display device.

In another feature of the invention, the invention allowing the creation of a one to one copy of the real world in the virtual world, providing a user with flexibility of location, relative orientation, etc that the virtual world provides (e.g., allowing typing while reclining in a comfortable chair, while standing and working at a distance from a large screen, while presenting information on a large screen to others or collaborating in real time with others while interacting with a computing device having a large screen display).

In another feature, the invention allows a user to input data into a virtual keyboard remotely from a displayed virtual image of the keyboard.

In another feature, the invention permits a user more comfort and flexibility in interacting with a PC or personal entertainment device, such as a multimedia player.

In an advantage, the device 20 provides a good drawing experience as the user sees the drawing at the location where the stylus 15 is acting (unlike graphic tablets). Because there is no need to manage actively a display as in tablet or eBook cases (pressure directly updates the screen due to the physical properties of this Reflex technology), the device 20 can be built at a low cost.

Moreover, the system and method of the invention contemplates the use, sale and/or distribution of any goods, services or information having similar functionality described herein.

The specification and figures are to be considered in an illustrative manner, rather than a restrictive one and all modifications described herein are intended to be included within the scope of the invention claimed, even if such is not specifically claimed at the filing of the application. Accordingly, the scope of the invention should be determined by the claims appended hereto or later amended or added, and their legal equivalents rather than by merely the examples described above. For instance, steps recited in any method or process claims may be executed in any order and are not limited to the specific order presented in any claim. Further, the elements and/or components recited in any apparatus claims may be assembled or otherwise operationally configured in a variety of permutations to produce substantially the same result as the present invention. Consequently, the invention is not limited to the specific configuration recited in the claims.

Benefits, other advantages and solutions mentioned herein are not to be construed as critical, required or essential features or components of any or all the claims.

As used herein, the terms "comprises", "comprising", or any variation thereof, are intended to refer to a non-exclusive listing of elements, such that any process, method, article, composition or apparatus of the invention that comprises a list of elements does not include only those elements recited, but may also include other elements described in this specification. The use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or otherwise adapted by the skilled artisan to other design without departing from the general principles of the invention.

The patents and articles mentioned above and in the appendix attached hereto are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. Accordingly, it is appropriate that the foregoing description be construed broadly and understood as being given by way of illustration and example only, the spirit and scope of the invention being limited only by the claims which ultimately issue in this application.

APPENDIX

Segmentation

Image Processing

REFERENCES

1. Lindeberg, T. (1991) *Discrete Scale-Space Theory and the Scale-Space Primal Sketch*, PhD thesis, Department of Numerical Analysis and Computing Science, Royal Institute of Technology, S-100 44 Stockholm, Sweden, May 1991. (ISSN 1101-2250. ISRN KTH NA/P-91/8-SE) (The grey-level blob detection algorithm is described in section 7.1)
2. Lindeberg, Tony, *Scale-Space Theory in Computer Vision*, Kluwer Academic Publishers, 1994, ISBN 0-7923-9418-6

The above articles are incorporated herein by reference in their entirety.

REFERENCE NUMBER LIST

Figure 2:
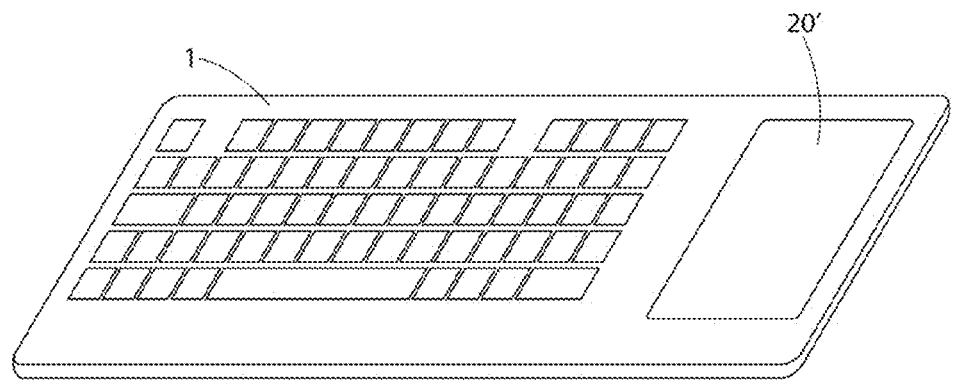
FIG. 2 is a schematic diagram of a keyboard input device in accordance with one embodiment of the invention.
Figure 3:
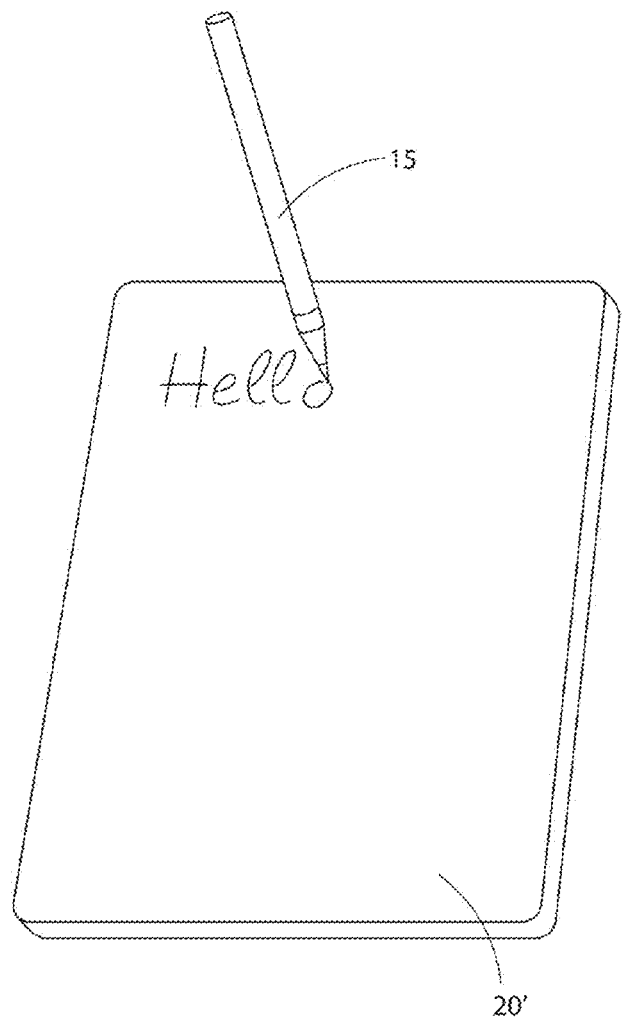
FIG. 3 is a schematic diagram of a note pad in accordance with one embodiment of the invention.
Figure 4:
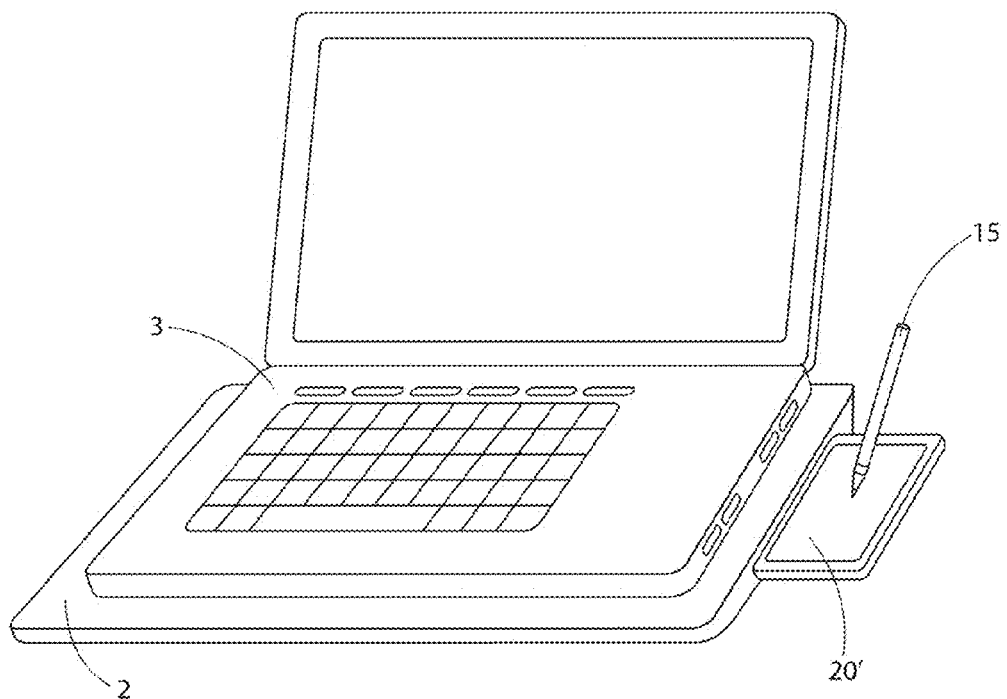
FIG. 4 is a schematic diagram of a note pad in accordance with one embodiment of the invention integrated into a docking station or lap desk.
Figure 5:
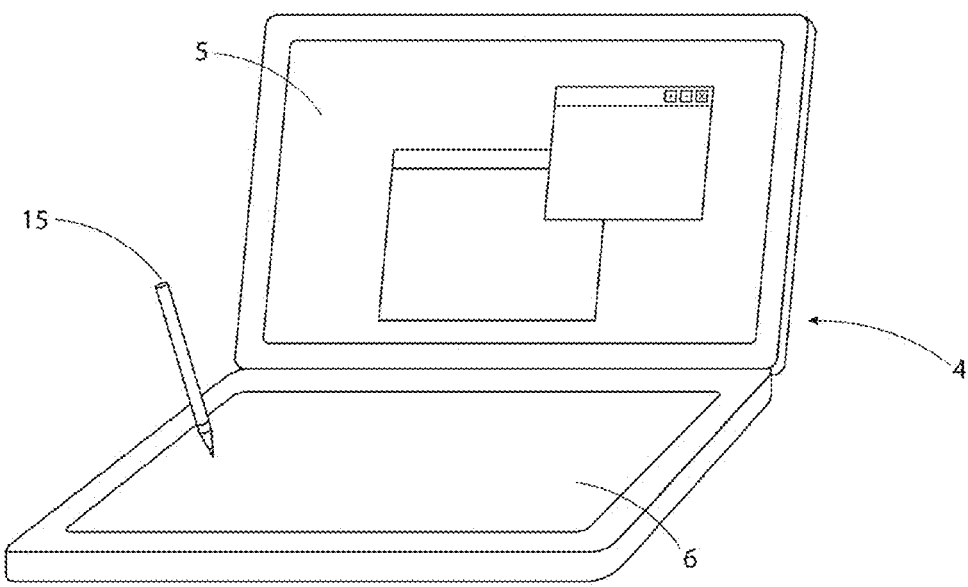
FIG. 5 is a schematic diagram of an e-book embodiment of the invention.

Keyboard 1 (FIG. 3)
FIG. 4
Lapdesk 2
Notebook 3
Dual screen tablet 4
Active display 5
Second screen/virtual ink display 6
Pressure sensor 9
FIG. 6
Multilayer assembly 60
Bottom layer 8
Intermediate pressure sensor layer 9
Modified middle layer 9', 9"
Top layer/inking surface 11
FIG. 18
Finger icon 13
FIGS. 1-3
System 10
Processor 12
PC, set-top box, multimedia device 14
Stylus 15
Display 16
Input device, MTAC 20 (entire keyboard), MTAC 20', MTAC 20"
Wireless hub 22
Operating system 24
Instructions 26
Method 30
Representation of target 32
Representation of input field 33
User 34
Target/user's finger 36
Thumbs 37
Principal input device 38
Principal input surface 40
Keying input field 42
Multi-touch input surface, touch surface 44
Input device 46
Auxiliary input device 48
FIG. 7
Glowing key 82
FIG. 9
Multi-touch surface 45
Grid 50
Zones 52
FIG. 10
Proximity Sensing Subsystem (PSS) 54
Transceiver 56
Data connection device (DCD) 58
Instructions 26
FIG. 11
Input device, MTAC 20'
Multilayer assembly 60'
Multitouch module 9'
Top layer/inking surface 11'
Touchpad sensor subassembly 61
Proximity sensors 62
Surface of touchpad module 64
PCB 66
Array of proximity sensors 68
Thin backlight 70
Glass panel 72
FIG. 12A
Multitouch surface 74
Circle 75
Grid 76
Distance d
FIG. 12B
Filled circles 80
Grid 76'
Key 82
FIG. 13
Table 90
FIG. 14
Step 100
Step 102
Step 104
Step 106
Step 110
Step 112
FIG. 15
Sensors 114
d1
d2
d3
d4
FIG. 16
Input device, MTAC 20"
Multilayer assembly 60"
Top layer/inking surface 11"
Multitouch module 9"
Touchpad sensor subassembly 61'
Proximity sensing module 120
PCB 122
Proximity electrodes 124
Touchpad module 126
Touchpad PCB 128
ITO dual layer 129
Glass panel 132
FIG. 17
Method 140
Step one 142
Step two 144
Step three 146
Step four 150
Step five 152
Step six 154
FIG. 19
Colored circle 170
Cross 172
dR 174

FIG. 20
First threshold 180
Active state 182
Second threshold 184
FIG. 21
Control board 200
Power management block 202
Microcontroller 204
Columns 206
Rows 210
Pressure sensor panel 212
LCD control 214
LCD display 216
RF Stage 220
FIG. 22
Upper flexible membrane 230
Resistance R
Separation layer 232
FIG. 23
ColumnD(3) 206'
Row(1) 210'
Resistors 240
FIG. 24
Method 300
Step 302
Step 303
Step 304

What is claimed is:

1. A capture device for capturing and processing hand annotation data that comprises at least three functional layers including:
    (a) a bottom rigid layer having a surface that provides a mechanical support for writing;
    (b) a top flexible touch sensitive passive LCD display layer including particles which change light properties in response to pressure, to produce an apparent ink display;
    (c) a middle pressure sensor layer for measuring touch pressure electrically independently from the top flexible touch sensitive passive LCD
    (d) a processing circuit directly coupled to the middle pressure sensor and configured order to create a pressure array or map of a capture active area indicating location and amount of pressure and to send and process the pressure data as inputs to a personal computer separate from the capture device; and
    (e) an LCD control configured to erase the apparent ink display of the passive LCD display layer in response to an activate signal.

2. The capture device of claim 1, wherein the flexible touch-sensitive passive LCD display is a reflective bistable cholesteric liquid crystal laminated between two conductive-polymer coated polyethyleneterephthalate substrates.

3. The capture device of claim 1, wherein the passive LCD display layer is provided in a variety of colors.

4. The capture device of claim 1, wherein the pressure sensor layer comprises a plurality of voltage sources and multiple ammeters, defining a plurality of electrical conductive paths, whose conductivity is modulated by the applied pressure on that path, wherein at least one ammeter measures current emitted from more than one of said voltage sources.

5. The capture device of claim 4, wherein the pressure sensor layer is a multilayer assembly, the multilayer assembly comprising:
    a. a first flexible layer in which parallel conductive paths are embedded;
    b. a second conductive separation layer; and
    c. a third flexible layer in which parallel conductive paths are embedded substantially perpendicular to the conductive paths of the first layer, wherein compression of the multilayer assembly changes the conductivity across the layers.

6. The capture device of claim 1, wherein the data captured is processed in association with a time stamps, measured pressure, touchpoint identifiers, proximity and type.

7. The device of claim 6, wherein the data is processed into a pressure map.

8. The capture device of claim 1, further comprising a control board which classifies the measured pressure map into various pressure points together with associated position and force.

9. The capture device of claim 1 wherein the device is coupled to the personal computer by a connection device selected from a group of connection devices consisting of USB, Bluetooth, other 2.4 GHz RF link, SPI or I2C interface, thereby permitting bi-directional communication of the device with the PC.

10. A capture device of claim 1 for enabling virtual input on a remote display, the capture device further comprising:
    at least one proximity sensor adapted to dynamically recognize the movement of at least one target in the proximity of the capture device:
    a data connection device adapted to transmit signals from the proximity sensor to a processor communicatively coupled to the remote display, and
    encoded instructions for, when a target is detected, overlaying a real-time, virtual representation of the target on the remote display in an orientation which represents the real world orientation of the target to the proximity sensor.

11. A system including a peripheral capture device for enabling virtual input on a remote display, the peripheral device including:
    (a) a capture device of claim 1, further adapted to dynamically classify and recognize the movement of at least one target in the proximity of the capture device; and
    (b) a data connection device adapted to transmit signals from the proximity sensor to a processor communicatively coupled to the remote display and to cooperate therewith so as to, when detected, overlay a real-time, virtual representation of the target over a representation of the input fields.

12. The system of claim 11, wherein the capture device is adapted to classify and recognize inputs made via a suitable protocol.

13. The system of claim 12, wherein the inputs classified and recognized are selected from a group of inputs consisting of keying. inking. gesturing, and pointing using a finger.

14. The system of claim 12, wherein the inputs classified and recognized are selected from a group of inputs consisting of keying, inking, gesturing, and pointing using a stylus.

15. The system of claim 12, wherein the inputs classified and recognized are used to turn on or turn off functionality to suit the task at hand.

16. The system of claim 12, wherein the suitable protocol is a classification process of sensed data.

17. The system of claim 16, wherein the sensed data includes any one of a group of sensed data consisting of proximity, distance, landing speed, touch, contact area, pressure segmentation, pressure distribution, heat, shape, footprint, pattern, capacitance, measured wavelength, biometric data, flux, induction, sound, and conductivity.

18. The system of claim 12 wherein the protocol used is combined with inputs to other input devices to define more complex meanings.

19. A system including a peripheral capture device for enabling virtual input on a remote display, the peripheral device including:
a capture device of claim 1, further adapted to dynamically classify and recognize a target parameter generated by at least one target in the proximity of the capture device; and
a data connection device adapted to transmit signals from the proximity sensor to a processor communicatively coupled to the remote display and to cooperate therewith so as to:
(i) construct a representation of input fields on the display, and
(ii) when detected, overlay a real-time, virtual representation of the target over the representation of the input fields.

20. The system of claim 19, wherein the target is one of a group of targets consisting of a user's hand or hands, finger or fingers, arm or arms, a stylus or styluses, and a pointer or pointers.

21. The system of claim 19, wherein the target parameter is a parameter of sufficient proximity, at which proximity a touch signal indicating touch is sent to the processor, thereby allowing traditional keypad use with the benefits of touch pad use.

22. The system of claim 19, wherein the proximity sensor is selected from a group of proximity sensors consisting of capacitive, infrared, electromagnetic, read switch, hall effect, resistive variation, conductive variation, echo, radio waves, heat detection, eddy currents, optical pattern recognition technologies and micro air flux change.

23. The system of claim 19, further comprising a multi-touch input surface.

24. The system of claim 23, wherein the multi-touch input surface is integrated onto a housing which is separable from a principle input surface permitting keying.

25. The system of claim 19, where the representation of the input fields for display in a window of a display is a representation of a virtual keyboard.

26. The system of claim 19, wherein the representation of input fields for display in a window of the display is transparent, permitting viewing of screen content visually underneath the representation of the input fields.

27. The system of claim 19 wherein the processor includes instructions in an instruction set for automatic system activation when the proximity sensor detects a target in appropriate proximity to the capture device.

28. The system of claim 27, wherein, upon automatic system activation, a representation of the target is displayed on the display.

29. The system of claim 27, wherein, upon automatic system activation, a representation of the input fields is displayed on the display.

30. The system of claim 19, where the representation of the target is presented using a depth cue selected from a group of depth cues consisting of:
variation of target size;
variation of target color and/or transparency;
variation of target shadow relative position;
variation of target shadow color and/or transparency;
variation of target shadow blur;
displaying arrows encoding the distance between the target and the input device surface; and
by a sound cue or a variation in sound emitted by an associated sound system as the target approaches or retreats from the input device surface.

31. The system of claim 19, wherein the virtual representation of the target is a simplified representation in which only an input end of the target is displayed oriented accurately with respect to the representation of the input fields.

32. The system of claim 19, wherein the end of the target opposite to the input end is presented in a simplified manner.

33. The system of claim 19, wherein the capture device is adapted to classify and recognize inputs made via a suitable protocol.

34. The system of claim 33, wherein the inputs classified and recognized are selected from a group of inputs consisting of keying, inking, gesturing, pointing using a finger.

35. The system of claim 33, wherein the inputs classified and recognized are selected from a group of inputs consisting of keying, inking, gesturing, pointing using a stylus.

36. The system of claim 33, wherein the inputs classified and recognized are used to turn on or turn off functionality to suit the task at hand.

37. The system of claim 33, wherein the suitable protocol is a classification process of sensed data.

38. The system of claim 37, wherein the sensed data includes any one of a group of sensed data consisting of proximity, distance, landing speed, touch, contact area, pressure segmentation, pressure distribution, heat, shape, footprint, pattern, capacitance, measured wavelength, biometric data, flux, induction, sound, and conductivity.

39. The system of claim 33 wherein the protocol used is combined with inputs to other input devices to define more complex meanings.

40. A system is provided for reproducing and displaying on a display the input relationship of a target, thereby allowing coordination of interactions of a user to be made by reference to the displayed virtual representations, the system including:
a. a capture device according to claim 1; and
b. an instruction set executable by the processor wherein, when input and/or proximity data are received from the input device by the processor, the processor constructs a representation of input fields for display in a window of the display, wherein further, the processor constructs and overlays a real-time, virtual representation of a target detected by the input device over such constructed representation.

41. The capture device of claim 1 wherein the top flexible touch-sensitive passive LCD display layer has an LCD surface wherein applied pressure changes the crystal particles orientation and light properties, such that when a stylus presses against a writing surface thereof, a visible trace is left which allows the user to produce a drawing though no real ink has flown.

* * * * *